US006658014B1

United States Patent
Tezuka

(10) Patent No.: US 6,658,014 B1
(45) Date of Patent: Dec. 2, 2003

(54) PACKET BUFFER DEVICE AND PACKET ASSEMBLING METHOD

(75) Inventor: Yasuo Tezuka, Yamato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/389,221

(22) Filed: Sep. 3, 1999

(30) Foreign Application Priority Data

Feb. 19, 1999 (JP) .......................................... 11-041785

(51) Int. Cl.[7] .............................................. H04L 12/54
(52) U.S. Cl. ...................... 370/412; 370/474; 370/395.7
(58) Field of Search .................. 370/229, 235, 370/351, 352, 357, 389, 392, 395.1, 396, 397, 395.21, 395.43, 395.7, 395.71, 395.72, 412, 415, 474

(56) References Cited

U.S. PATENT DOCUMENTS

| | | | |
|---|---|---|---|
| 4,953,157 A | | 8/1990 | Franklin et al. |
| 5,233,606 A | | 8/1993 | Pashan et al. |
| 5,546,389 A | | 8/1996 | Wippenbeck et al. |
| 5,583,858 A | * | 12/1996 | Hanaoka .................. 370/235.1 |
| 5,787,086 A | * | 7/1998 | McClure et al. ............. 370/413 |
| 5,867,663 A | * | 2/1999 | McClure et al. ............. 370/413 |
| 5,940,375 A | * | 8/1999 | Soumiya et al. ............ 370/235 |
| 6,430,191 B1 | * | 8/2002 | Klausmeier et al. ........ 370/412 |

OTHER PUBLICATIONS

Shinohara et al. "Multiclass Large Scale ATM Switch with QoS Guarantee". IEEE Communications. Jun. 8–12, 1997. Pp. 453–461.*

* cited by examiner

Primary Examiner—Melvin Marcelo
Assistant Examiner—Derrick W. Ferris
(74) Attorney, Agent, or Firm—Staas & Halsey LLP

(57) ABSTRACT

A packet buffer device and a packet assembling method in a packet transfer module to assemble logical channel-multiplexed asynchronous transfer mode (ATM) cells into packets and to store and output the cells in packet units. The packet buffer device includes a discrete buffer controller to generate a discrete buffer from a common buffer, a buffer type determination unit to determine a buffer type in which to store an ATM cell for each input ATM cell, and a packet buffer controller to assign the ATM cell to the common buffer or to the discrete buffer according to the buffer type. Thus, a common buffer and discrete buffers are dynamically constructed and buffers of respectively differing type can be used for packets of differing service mode. Further, optimal buffer resource usage can be achieved by using the buffer capacity of both a common buffer type and a discrete buffer type to store packets.

11 Claims, 27 Drawing Sheets

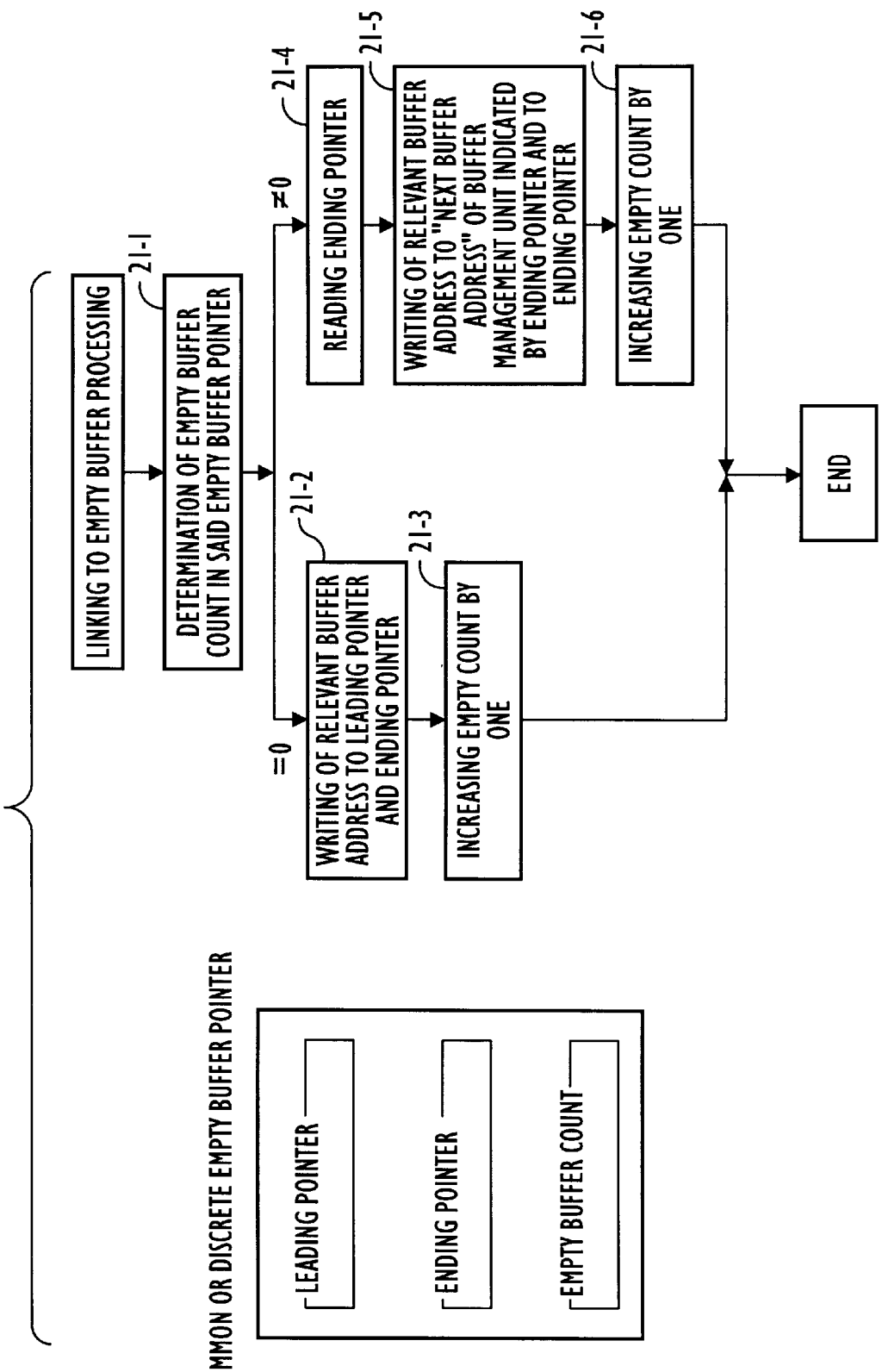

PACKET BUFFER DEVICE AND PACKET ASSEMBLING METHOD

CROSS-REFERENCE TO RELATED APPLICATION

This application is based upon and claims priority of Japanese Patent Application No. 11-041785 filed on Feb. 19, 1999, the contents being incorporated herein by reference.

BACKGROUND OF THE INVENTION

1. Field of the Invention

The present invention relates to a packet buffer device and a packet assembling method in a packet transfer module which assembles logical channel-multiplexed asynchronous transfer mode (ATM) cells into packets and stores and outputs the cells in packet units. More particularly, the present invention relates to a packet buffer device and a packet assembling method in a packet transfer module for a mixed network including best effort-type packet transfer services using a common buffer, and guaranteed-type packet transfer services (bandwidth guarantee) using discrete buffers.

2. Description of the Related Art

FIG. 1 is a diagram illustrating the location of network installation of packet transfer modules in an ATM network. As shown in FIG. 1, the packet transfer modules 24-1 installed in the ATM network are connected to one another, and are connected to user network routers 24-3 via multiplexing devices 24-2.

Individual packet transfer modules 24-1, multiplexing devices 24-2, and routers 24-3 are connected by an asynchronous transfer mode interface. Individual packets sent from a user network are converted to ATM cells by a router 24-3 using an ATM adaptation layer type 5 (referred to hereinafter as "AAL-type 5") or other such protocol. The multiplexing devices 24-2 perform multiplexing of ATM cells for multiple users and provide the multiplexed ATM cells to respective packet transfer modules 24-1.

The respective packet transfer modules 24-1 assemble packets from ATM cells and transfer packets to another packet transfer module 24-1 accommodated in a remote destination user network or to a remote destination user network accommodated in the same packet transfer module 24-1 according to remote destination address information within a packet header.

FIG. 2 is a block diagram of a packet transfer module 25-10. As shown in FIG. 2, ATM cells multiplexed into logical channel units are input from another packet transfer module or multiplexing device to the packet transfer module 25-10 via a circuit. A logical channel is a channel identified by a virtual channel identifier (VPI/VCI) or the like.

The packet transfer module 25-10 includes a physical terminal device 25-11 to perform physical layer termination of the ATM cell input/output, an ATM terminal device 25-12 to perform ATM layer termination of ATM cell input/output, and an AAL-type 5 terminal device 25-13 to perform AAL-type 5 termination of ATM cell input/output. The AAL-type 5 terminal device 25-13 may also be another ATM adaptation layer-type terminal device, such as a type 3 or type 4 termination device.

A packet buffer device 25-14 identifies an ATM cell, which is a packet end data for each logical channel, based on payload-type indication information in the ATM cell header and according to AAL-type 5 flow control or the like. The packet buffer device 25-14 assembles a packet from ATM cells received up to that point. Packet header information including a remote destination address or the like is then output to an upper layer device 25-15.

The upper layer device 25-15 searches an input packet for a transfer destination and transmits the result of the search for a transfer destination to the packet buffer device 25-14. The packet buffer device 25-14 converts a transfer destination designated by the upper layer device 25-15 to a logical channel and outputs, in packet units, ATM cells assembled into packets.

A packet transfer module controller 25-16 performs initial setting, status control and the like of each device in the packet transfer module 25-10. ATM cells output from the packet transfer module 25-10 are multiplexed into packet units and output in this form.

A conventional packet buffer device uses two types of buffering methods. One type of buffering method is to use a common buffer which stores, in a single common buffer resource, ATM cells from all subscribers to which a logical channel is assigned. Another type of buffering method is to use a conventional packet buffer device comprising discrete buffers which store ATM cells from individual subscribers in discrete buffer resources having fixed capacity previously assigned to each individual logical channel FIG. 3 is a diagram illustrating the operation of a packet buffer device using a common buffer. As shown in FIG. 3, when a plurality of logical channel-multiplexed ATM cells corresponding to channels A, B, C, and D are input, the packet buffer device stores the plurality of ATM cells in packet units in a buffer memory 26-1 which is commonly assigned to individual logical channels.

When many ATM cells corresponding to channel A are input to the common buffer memory 26-1 so that the amount of channel A buffer memory used increases and there is insufficient empty capacity in the buffer memory 26-1, packets corresponding to another channel, such as channel D, are abandoned.

FIG. 4 is a diagram illustrating the operation of a packet buffer device using discrete buffers. As shown in FIG. 4, when a plurality of logical channel-multiplexed ATM cells corresponding to channels A, B, and C are input, the packet buffer device stores the several ATM cells in discrete buffers within a buffer memory 27-1, which discrete buffers are dedicated respectively to channel A, B, C, D and E use.

In a packet buffer device using discrete buffers, congestion among channels has no mutual effect. For example, as shown in FIG. 4, even though discrete buffers for channel D and channel E are empty, if the discrete buffers for channel A and channel B converge, packets from these channels will be abandoned.

In a packet buffer device using a common buffer, buffer processing during buffer congestion does not distinguish between packets associated with high priority, guaranteed-type transfer service, and packets associated with low-priority, best effort-type packet transfer service. Thus, it is not possible to effect abandonment processing that discriminates according to transfer service grades.

On the other hand, a packet buffer device using discrete buffers is problematic in that, if there is insufficient capacity in a certain discrete buffer resource, packets corresponding to the discrete buffer with insufficient buffer capacity are abandoned even though there is capacity in another discrete buffer resource. As a result, buffer resources are not used effectively and best effort-type packet transfer service cannot be provided with good efficiency.

Recently, ATM networks transferring Internet Protocol (IP) packets and the like have seen a transition to high speeds and high-level multiplexing, as well as a further proliferation of transfer service grades. The response to such packet transfer services requires packet buffer devices which use buffer resources optimally and which also use buffer resources selectively according to transfer service grade.

SUMMARY OF THE INVENTION

It is an object of the present invention to provide a method and apparatus for dynamically constructing common buffers and discrete buffers.

Another object of the present invention is to provide a method and apparatus for optimally assigning the buffer capacity of both a common buffer type and a discrete buffer type to achieve optimal use of buffer resources.

A further object of the present invention is to provide a packet transfer service corresponding to a service mode such that packets associated with different service mode subscribers are selectively apportioned to buffers differing according to individual service mode type, even in an instance wherein the subscribers accommodated are a mixture of differing service mode subscribers.

Objects and advantages of the present invention are achieved in accordance with embodiments of the present invention with a packet buffer device to store ATM cells multiplexed and input via multiple logical channels, and to assemble ATM cells corresponding to each logical channel into packets in a buffer, comprising a discrete buffer controller to generate a discrete buffer from a common buffer; a buffer type determination unit to determine a buffer type to store an ATM cell for each input ATM cell; and a packet buffer controller to assign the ATM cell to the common buffer or to the discrete buffer, according to the buffer type.

In accordance with the present invention, the discrete buffer controller releases the discrete buffer to the common buffer after outputting the assembled packet.

In accordance with embodiments of the present invention, the buffer type determination unit further comprises a target logical channel setting unit to set a correspondence between buffer type information designating a discrete buffer or a common buffer and an ATM cell logical channel; and a comparator to compare the logical channel of an input ATM cell and the ATM cell logical channel, and to output the buffer type information corresponding to the logical channel of the input ATM cell.

In accordance with the present invention, the target logical channel setting unit includes bit designation information to designate a logical channel determination target bit set for each discrete buffer type, and the comparator compares a logical channel determination target bit for an input ATM cell to the logical channel determination target bit designated by the bit designation information, and outputs the buffer type information designating a discrete buffer type when there is a match, or buffer type information designating a common buffer when there is not a match.

In accordance with embodiments of the present invention, the target logical channel setting unit includes priority degree information to indicate the degree of priority of an ATM cell or a packet for each discrete buffer type, and wherein the comparator compares information indicating the priority degree of an input ATM cell or a packet and priority degree information indicating the degree of priority, and outputs the buffer type information according to the comparison results.

In accordance with embodiments of the present invention, the packet buffer device further comprises an empty buffer pointer, for each buffer type, to hold an empty buffer leading pointer linking empty buffers in a chain, and an empty buffer count; and a buffer management unit, for each buffer, to hold a buffer type, and a next address of an empty buffer linked in a chain, wherein the packet buffer controller sequentially acquires buffers from the empty buffer indicated by the empty buffer leading pointer according to buffer type information from the buffer type determination unit, and controls packet assembly.

In accordance with the present invention, the packet buffer controller reads the empty buffer count held in the empty buffer pointer corresponding to the discrete buffer type in response to acquiring a discrete buffer, acquires a buffer from an empty buffer of a common buffer in response to determining that there is no empty discrete buffer to acquire, and performs control of packet assembly.

In accordance with embodiments of the present invention, the packet buffer controller further comprises a device to assess a discrete buffer increase indication from the discrete buffer controller, to rewrite a buffer type held within the buffer management unit corresponding to a buffer acquired from an empty buffer of a common buffer to a buffer type designating a relevant discrete buffer in response to the discrete buffer increase indication, and to modify several buffers acquired from a common buffer to discrete buffers.

In accordance with embodiments of the present invention, the packet buffer device may further comprise a buffer management unit to hold a buffer type for each buffer, and the discrete buffer controller may further comprise a discrete buffer total designation unit to designate a discrete buffer total for each buffer type; a buffer counter to count discrete buffers; a buffer construction indication unit to indicate buffer construction; and a management unit to rewrite the buffer type of the buffer within the buffer management unit to a discrete buffer type, during buffer release processing following ATM cell output, when the buffer is a common buffer and a buffer construction indication is present in the buffer construction indication unit, to increase the buffer counter, and to turn off the buffer construction indication when the buffer counter reaches the discrete buffer total.

In accordance with embodiments of the present invention, the discrete buffer controller further comprises a buffer release indication unit to indicate buffer release, and the management unit rewrites the buffer type of the buffer within the buffer management unit to a common buffer type during buffer release processing following ATM cell output when the buffer is a discrete buffer and a buffer release indication is present in the buffer release indication unit, decreases the buffer count, and turns off the buffer release indication when the buffer count reaches the discrete buffer total.

In accordance with embodiments of the present invention, the packet buffer device further comprises a discrete empty buffer pointer to hold an empty buffer leading pointer linking empty buffers in a chain, and an empty buffer count; and an empty buffer count minimum value storage unit to store a minimum value corresponding to the empty buffer count, and the discrete buffer controller further comprises an adjustment interval timer to set a period for optimization processing of the number of discrete buffers; and wherein the management unit reads the empty buffer count minimum value at a period set by the adjustment interval timer, subtracts the empty buffer count minimum value from a value read from the discrete buffer total designation unit, sets the subtracted value in the discrete buffer total designation unit, and turns on the buffer release indication.

In accordance with embodiments of the present invention, the packet buffer device further comprises a discrete empty buffer pointer to hold an empty buffer leading pointer linking empty buffers in a chain, and an empty buffer count; and an empty buffer count minimum value storage unit to store a minimum value corresponding to the empty buffer count, and the discrete buffer controller further comprises an adjustment interval timer to set a period for optimization processing of the number of discrete buffers; a threshold value setting unit to set a threshold value for the empty buffer count minimum value in order to determine whether or not to perform optimization processing of the number of discrete buffers; and a release count designation unit to set a number of buffers to release, wherein the management unit reads the empty buffer count minimum value at a period set by the adjustment interval timer, subtracts the setting in the release count designation unit from the discrete buffer total when the empty buffer count minimum value read is larger than the threshold value, sets the subtracted value in the discrete buffer total designation unit, and turns on the buffer release indication.

Objects and advantages of the present invention are achieved in accordance with embodiments of the present invention with a packet buffer device to store ATM cells multiplexed and input via multiple logical channels, and to assemble ATM cells pertaining to each logical channel into packets in a buffer, comprising a determining device to determine a buffer type to store an ATM cell for each input ATM cell; and an assigning device to assign the ATM cell according to the buffer type, to a common buffer or a discrete buffer according to the buffer type.

In accordance with embodiments of the present invention, the assigning device assigns an ATM cell whose buffer type is a discrete buffer type to the common buffer when there is no discrete buffer.

The packet buffer device in accordance with embodiments of the present invention may further comprise a changing device to change a number of common buffer or a number of discrete buffer dynamically in response to a condition.

In accordance with embodiments of the present invention, the common buffer is assigned to commonly store ATM cells corresponding to each logical channel, and the discrete buffer is assigned to store ATM cells corresponding to a specified logical channel.

Objects and advantages of the present invention are achieved in accordance with embodiments of the present invention with packet assembling method for assembling ATM cells multiplexed and input via multiple logical channels into packets, comprising determining a buffer type in which to store an ATM cell for each input ATM cell; and assigning the ATM cell to a common buffer or a discrete buffer according to the buffer type determination.

In accordance with the present invention, the packet assembling method further comprises assigning the ATM cell whose buffer type is a discrete buffer type to the common buffer when there is no discrete buffer.

In accordance with embodiments of the present invention, the packet assembling method further comprises changing a number of common buffer or a number of discrete buffer dynamically in response to a condition.

Thus, the packet buffer device in accordance with embodiments of the present invention can dynamically construct a discrete buffer according to the number of discrete buffers used, and can allocate buffer resources of differing type according to packet type.

Further, the packet buffer device in accordance with embodiments of the present invention can apportion the logical channel ATM cells set by the target logical channel setting unit to differing types of discrete buffers.

In accordance with the present invention, cell loss priority indication (CLP) for an ATM cell or IPv6 packet priority information may also be used as the information indicating priority.

Moreover, the packet buffer device in accordance with embodiments of the present invention can increase discrete buffers to the generated or designated discrete buffer count corresponding to the designated buffer total at buffer release.

Furthermore, the packet buffer device in accordance with embodiments of the present invention can decrease discrete buffers to the released or designated discrete buffer total at buffer release.

Further, the packet buffer device in accordance with embodiments of the present invention can release the number of discrete buffers not used in the duration of the optimization processing period to the common buffer.

Moreover, the packet buffer device in accordance with embodiments of the present invention can release the designated number of buffers set in the release count designation unit to a common buffer when the number not used in the duration of the optimization processing period is larger than the threshold value.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 22A and 22B are a flowchart illustrating operation of a management unit within the discrete buffer generation controller in accordance with embodiments of the present invention.

DESCRIPTION OF THE PREFERRED EMBODIMENTS

Figure 1:
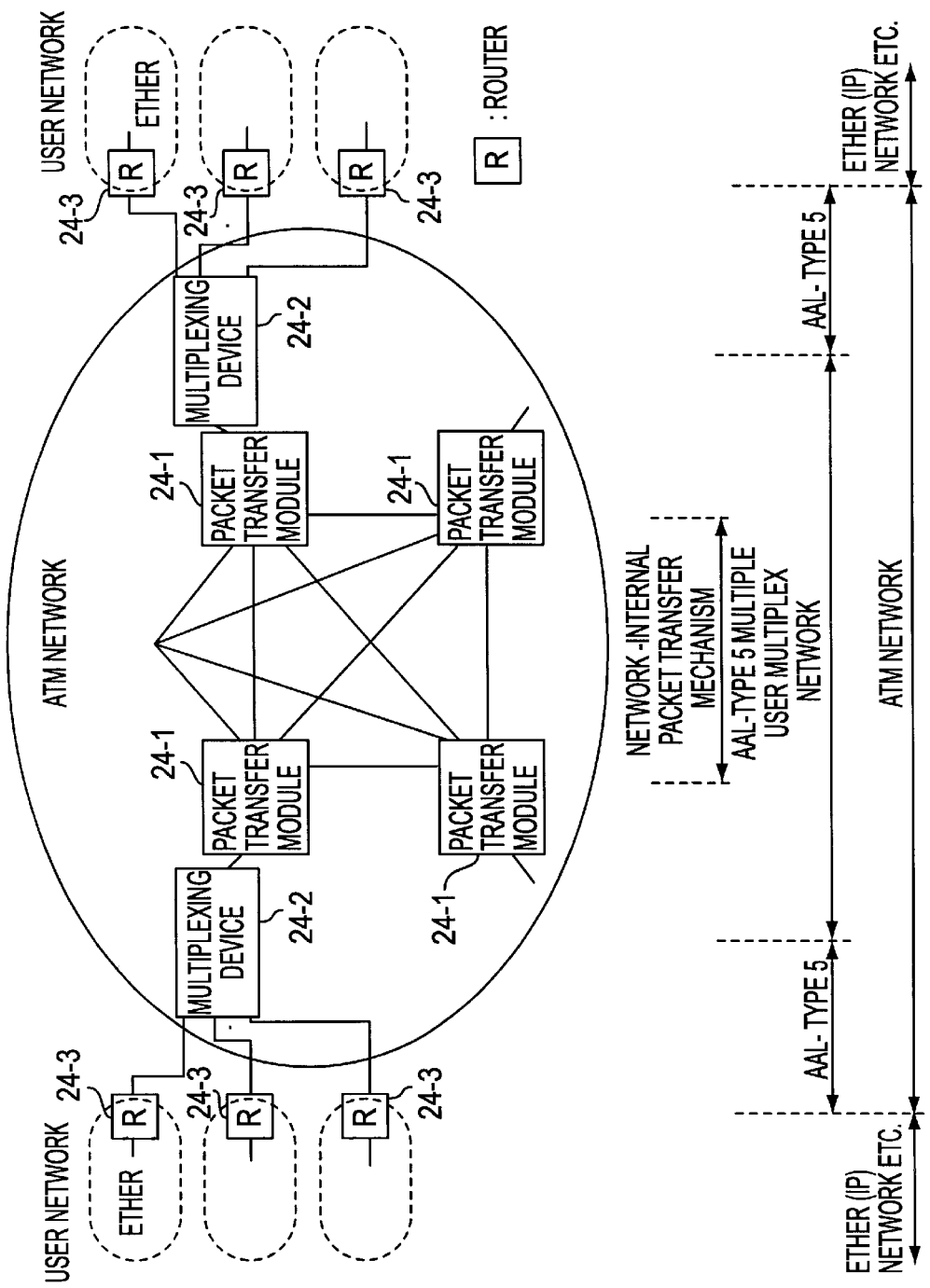
FIG. 1 is a diagram illustrating location of network installation of packet transfer modules in an ATM network.
Figure 2:
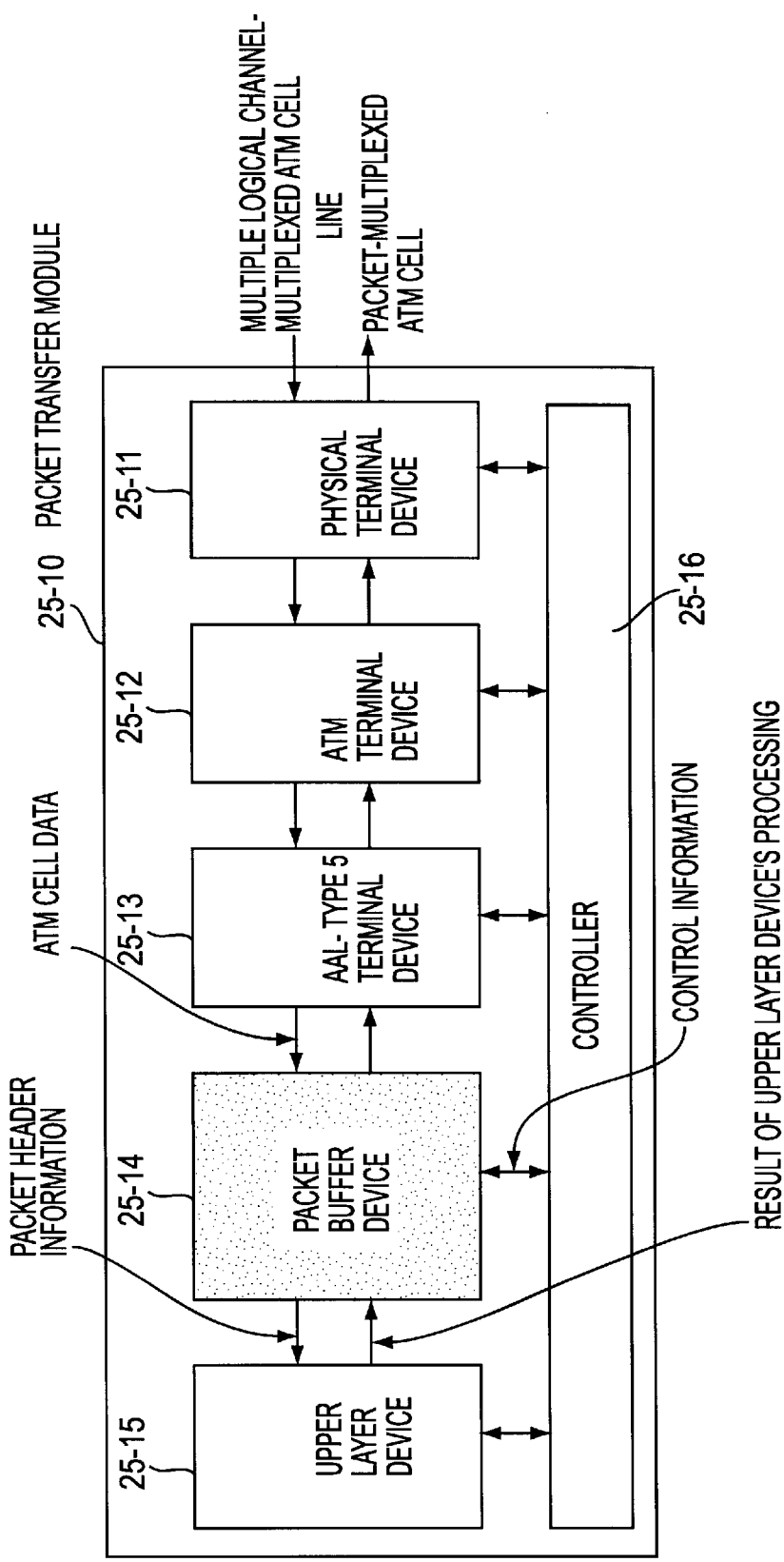
FIG. 2 is a block diagram of a packet transfer module.

Reference will now be made in detail to the preferred embodiments of the present invention, examples of which are illustrated in the accompanying drawings wherein like reference numerals refer to the same or similar elements throughout.

Figure 5:
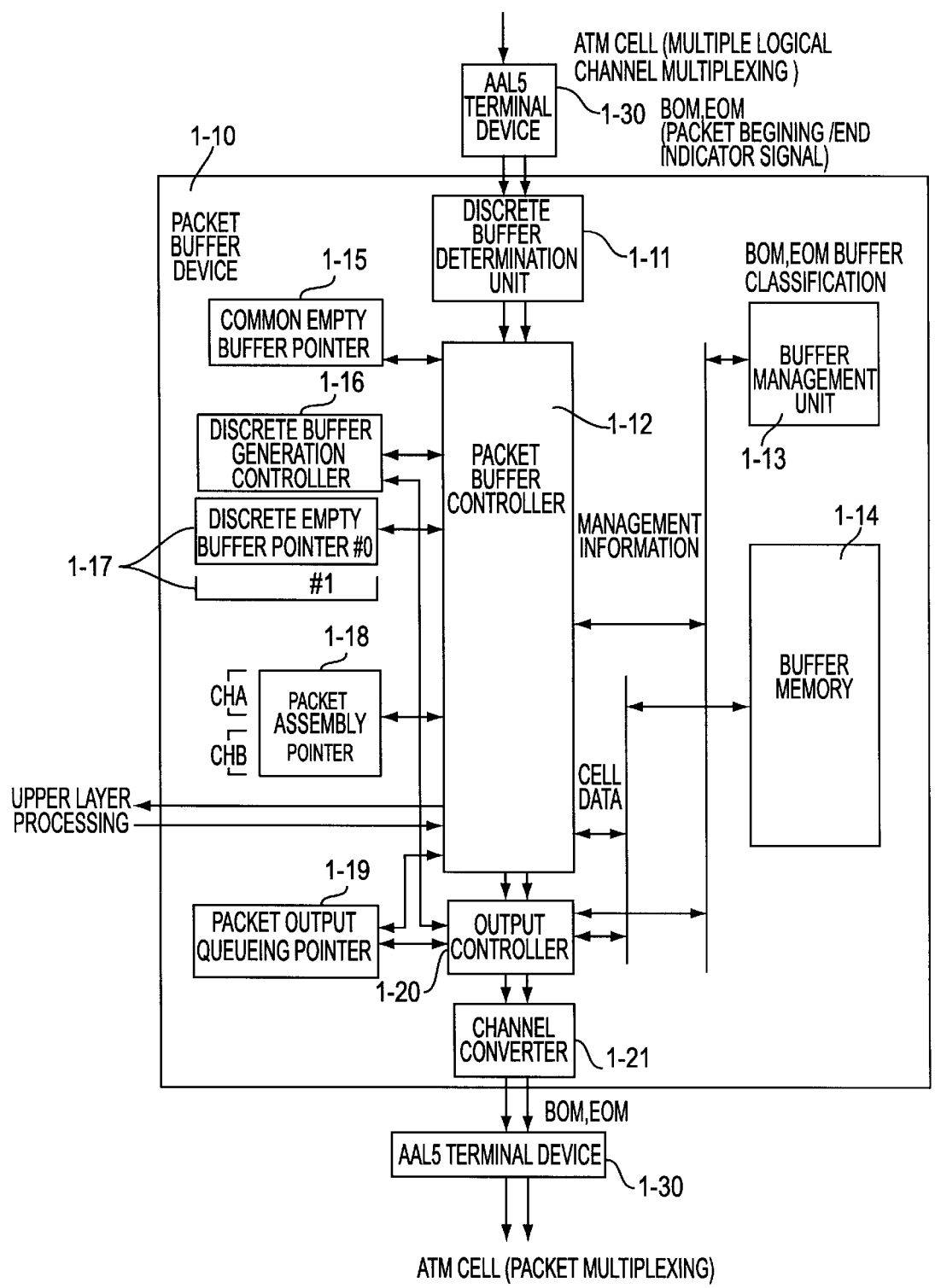
FIG. 5 is a block diagram of a packet buffer device in accordance with embodiments of the present invention.

FIG. 5 is a block diagram of a packet buffer device 1-10 in accordance with embodiments of the present invention. The packet buffer device 1-10 can be used in the ATM network as shown in FIG. 1. As shown in FIG. 5, the packet buffer device 1-10 includes a discrete buffer determination unit 1-11, a packet buffer controller 1-12, a buffer management unit 1-13, a buffer memory 1-14, a common empty buffer pointer 1-15, a discrete buffer generation controller 1-16, a discrete empty buffer pointer 1-17, a packet assembly pointer 1-18, a packet output queuing pointer 1-19, an output controller 1-20, and a channel converter 1-21. The packet buffer device 1-10 is connected to AAL-type 5 terminal devices 1-30.

When a multiple channel-multiplexed ATM cell is input from the AAL-type 5 terminal device 1-30 to the packet buffer device 1-10, the discrete buffer determination unit 1-11 determines the buffer type, that is, a common buffer type or a discrete buffer type, which the ATM cell will use based on ATM cell header, or the like information. The discrete buffer determination unit 1-11 adds the buffer type information to the ATM cell, and provides an output to the packet buffer controller 1-12.

If the buffer type information corresponds to a common buffer, the packet buffer controller 1-12 acquires an empty buffer region within the buffer memory 1-14 as indicated by the common empty buffer pointer 1-15. On the other hand, if the buffer type information corresponds to a discrete buffer, the packet buffer controller 1-12 acquires an empty buffer region within the buffer memory 1-14 as indicated by the discrete empty buffer pointer 1-17 and writes cell data into the empty buffer.

The address of the buffer region into which cell data is written is then linked to a buffer address undergoing packet assembly, as indicated by the packet assembly pointer 1-18, and a buffer address link is then created as a logical channel unit within the buffer memory 1-14 to store cell data while assembling a packet.

Once the packet buffer controller 1-12 completes packet assembly, header data for the assembled packet is provided to the upper layer, and a processing complete notification is received from the upper layer. The packet is then linked to the packet output queuing pointer 1-19.

The output controller 1-20 monitors the output queuing status of the packet output queuing pointer 1-19, and if an output queuing status packet is present, cell data is read from the buffer memory 1-14 address indicated by the packet output queuing pointer 1-19, and cells are output in a packet unit.

The discrete buffer generation controller 1-16 either releases a buffer storing previously output cells to an empty buffer of the original type, or exercises control to either generate and add a discrete buffer or to decrease a discrete buffer according to setting information.

The channel converter 1-21 converts logical channels corresponding to cells read and output from the buffer memory 1-14 to logical channels indicated by the upper layer and outputs the cell data to the AAL-type 5 terminal device 1-30.

The buffer management unit 1-13 is provided with a management unit for a buffer segment to each 1-cell data portion. Each buffer management unit 1-13 comprises a buffer link information unit, a buffer type information unit, and a transfer control information unit. A next buffer address is written into the buffer link information unit. Information written into the buffer type information unit indicates whether the relevant buffer is a common buffer or a type of discrete buffer corresponding to the relevant buffer. Packet length (buffer count), an upper layer processing complete flag, an output channel number, and header addition/deletion information are written into the transfer control information unit.

The buffer management unit 1-13 comprises a memory element. The buffer management unit 1-13 may comprise an independent memory element separate from buffer memory 1-14, or the memory element may be provided within the same memory as the buffer memory 1-14.

Thus, in the packet buffer device 1-10 in accordance with embodiments of the present invention, the discrete buffer determination unit 1-11 determines the buffer type that an input cell will use. The packet buffer controller 1-12 acquires an empty buffer of the buffer type determined by the discrete buffer determination unit 1-11 according to empty buffer pointer information corresponding to the buffer type thus determined.

As a result, input cell data can be apportioned respectively to buffers of differing type and stored in the buffer memory 1-14 according to the service grade of a logical channel or the like. The packet assembly pointer 1-18 and the buffer management unit 1-13 can then connect a sequential chain of buffers storing 1-cell portions of data and assemble packet units.

The packet buffer controller 1-12 links packets already assembled in an output-ready status to the packet output queuing pointer 1-19, and, based on information from the packet output queuing pointer 1-19, the output controller 1-20 reads and outputs one cell at a time from the buffer memory 1-14 in packet units.

When a buffer is released after outputting a packet (cell), the discrete buffer generation controller 1-16, according to setting information, returns the buffer to a common buffer, or exercises control to generate, increase or decrease a discrete buffer. Further, after buffer release following packet (cell) output, the discrete buffer generation controller 1-16 carries out buffer allotment optimization processing according to a setting period.

The packet buffer device in accordance with embodiments of the present invention dynamically constructs common buffers and discrete buffers, uses buffers of respectively differing type for packets of differing service mode, and allows discrimination of abandonment processing and the like according to service grade. The packet buffer device in accordance with the present invention also performs optimization of discrete buffer allotment according to buffer usage status and allows buffer resource use with good efficiency.

Figure 6:
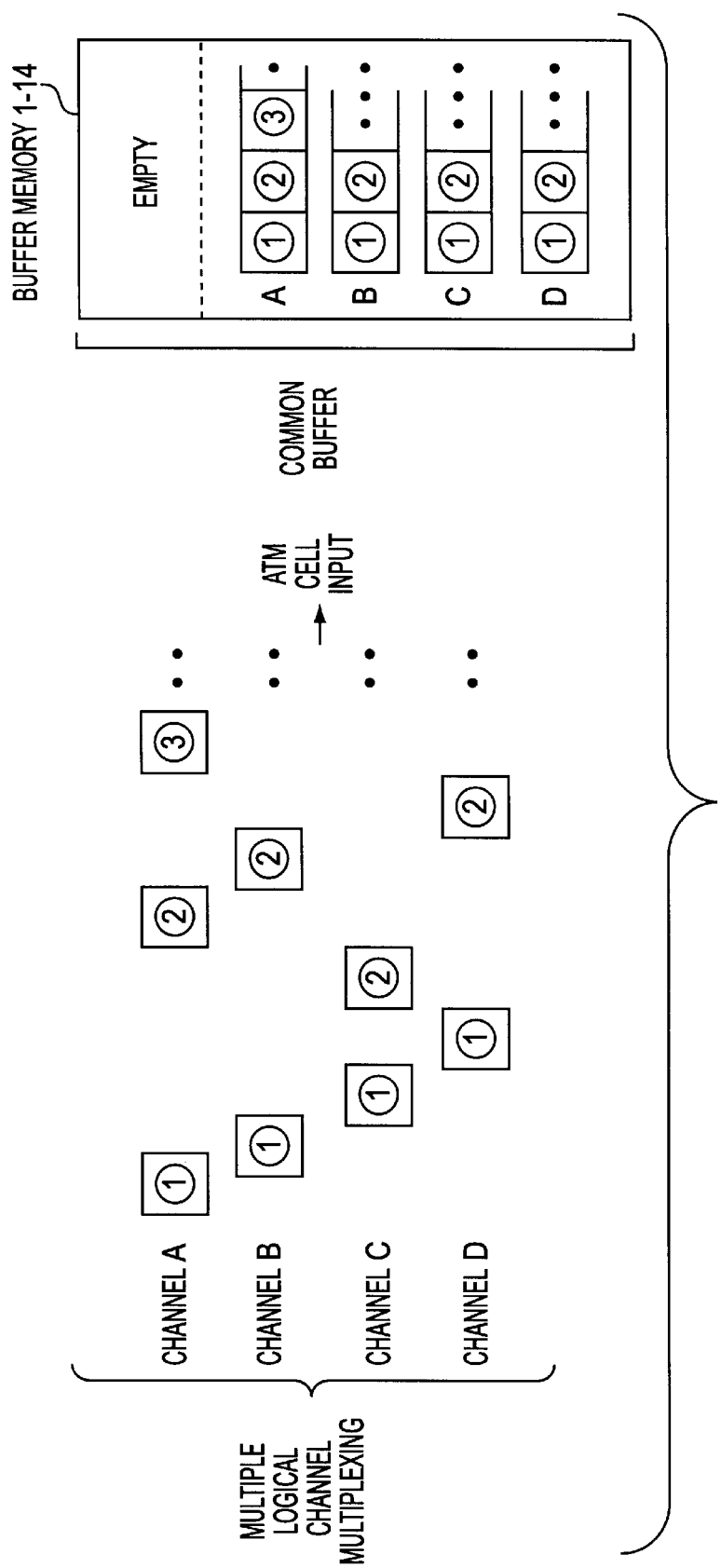
FIG. 6 is a diagram illustrating operation of the packet buffer device in accordance with embodiments of the present invention.
Figure 7:
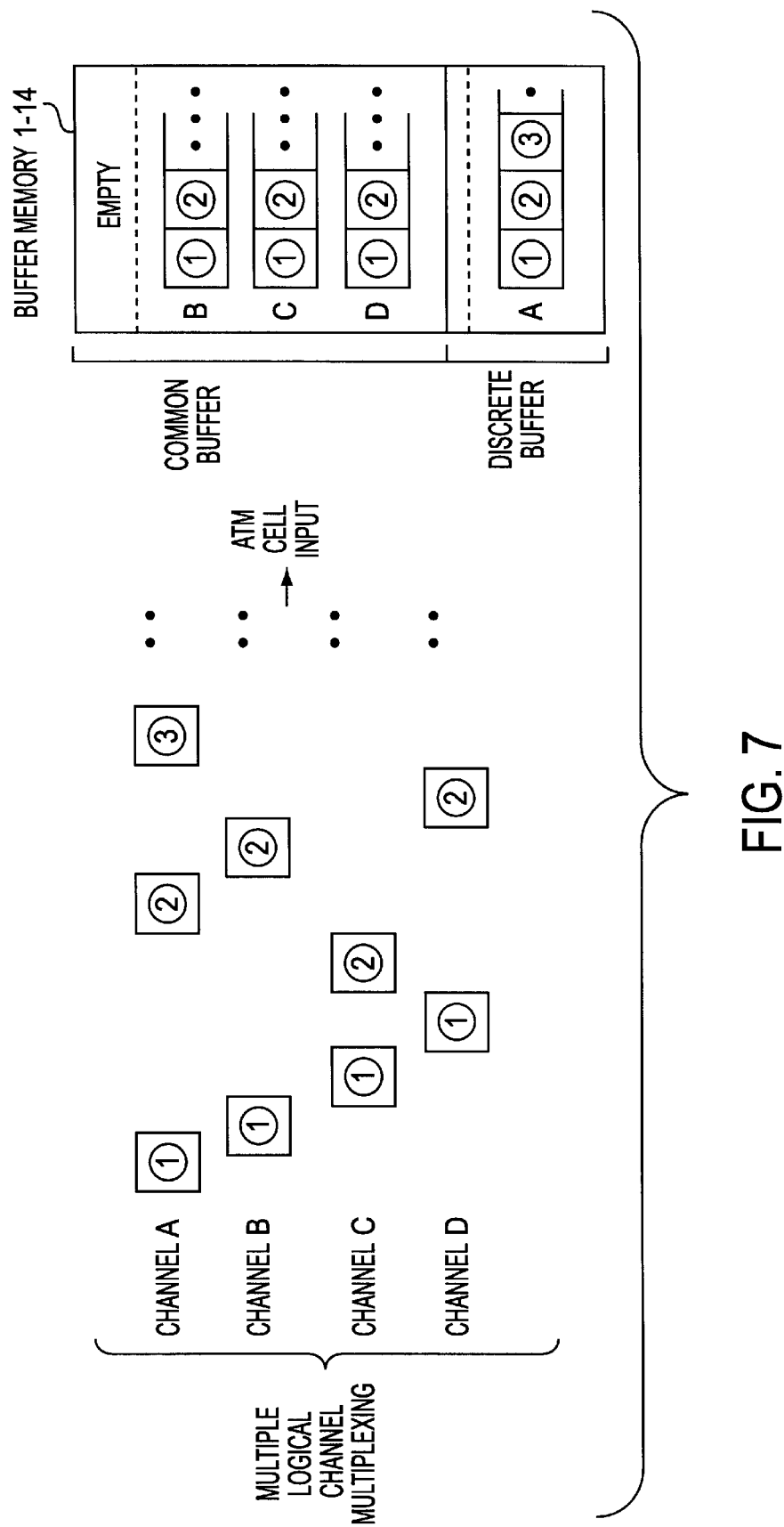
FIG. 7 is a diagram illustrating operation of the packet buffer device in accordance with embodiments of the present invention.

FIG. 6 and FIG. 7 illustrate operation of the packet buffer device in accordance with embodiments of the present invention. As shown in FIG. 6 and FIG. 7, ATM cells with channel A, B, C, and D-multiplexed multiple logical channels are input.

FIG. 6 illustrates a cell data storage state when the buffer memory 1-14 is used as a common buffer. FIG. 7 illustrates a cell data storage state when the buffer memory 1-14 is divided into a common buffer and a discrete buffer.

Figure 3:
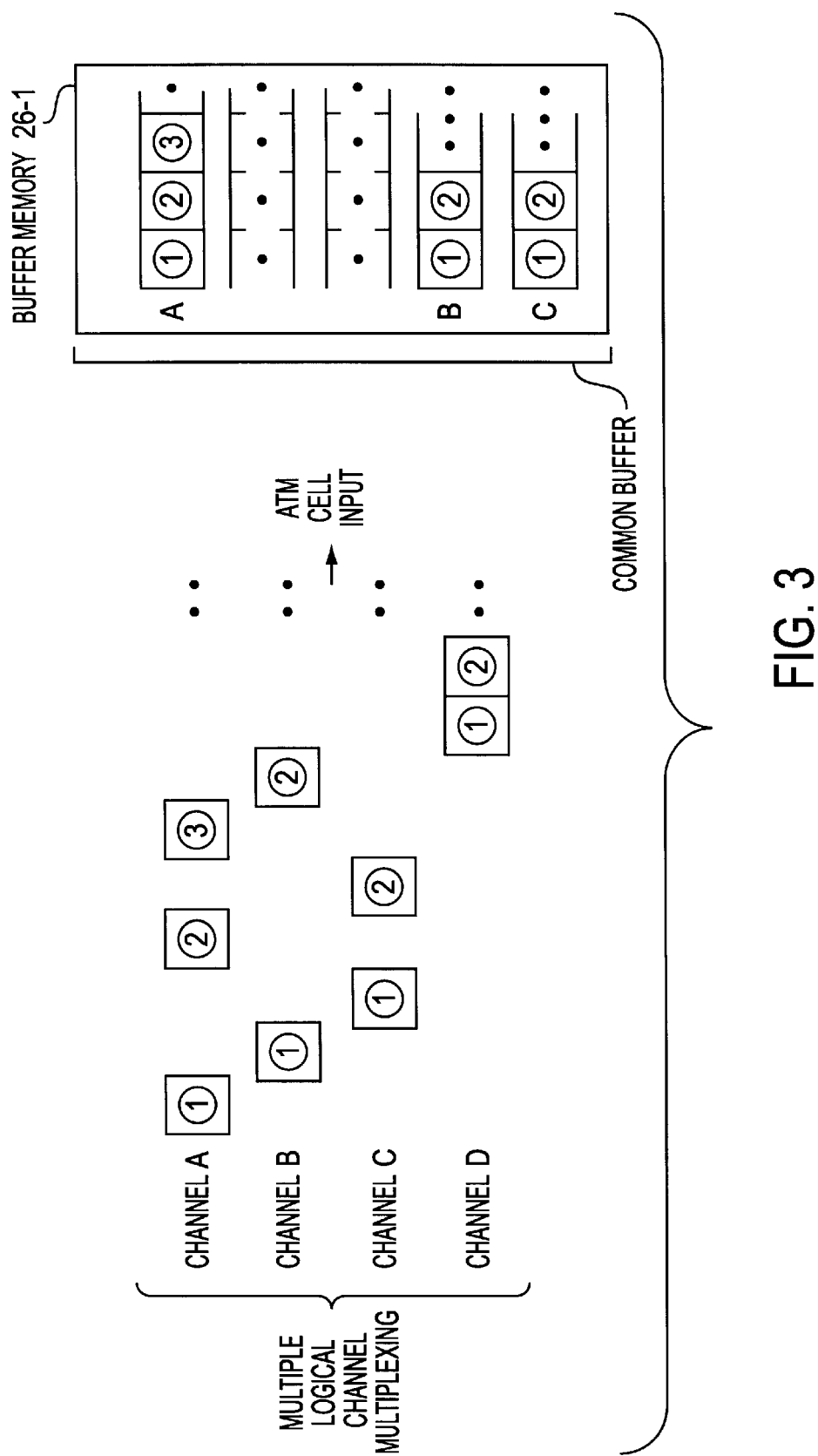
FIG. 3 is a diagram illustrating operation of a packet buffer device using a common buffer.
Figure 4:
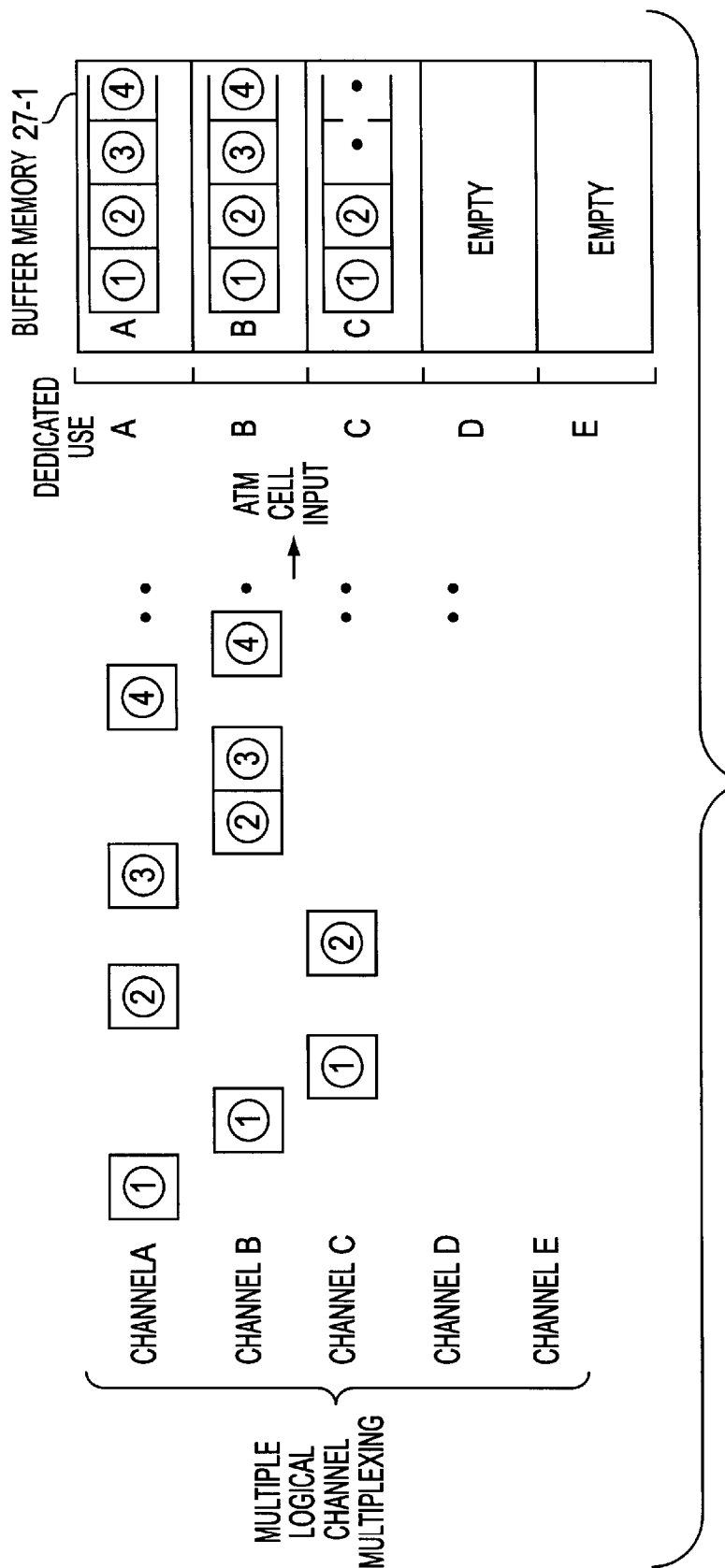
FIG. 4 is a diagram illustrating operation of a packet buffer device using discrete buffers.

As shown in FIG. 6, when the buffer memory 1-14 is used only as a common buffer, cell data for individual channels A, B, C, and D is stored in the same memory resource. This operation is similar to the previously discussed operation shown in FIG. 3.

As shown in FIG. 7, when the buffer memory 1-14 is divided into a common buffer and a discrete buffer, only a specific packet, such as a channel A packet, uses the discrete buffer, and packets corresponding to other channels use the common buffer.

When a common buffer and a discrete buffer are used jointly, discrete buffer generation is first performed. In performing discrete buffer generation, a fixed number of buffer segments previously determined by a microprogram or the like are detached from the common buffer, and the discrete buffer comprises the fixed number of buffer segments, which store only cells corresponding to specific packets, such as those of a certain specific logical channel. A plurality of discrete buffers can be generated simultaneously as a response to different types of packets.

FIGS. 8A, 8B, 8C, 8D and 8E are diagrams describing input data and output data in the packet buffer device in accordance with embodiments of the present invention. As shown in FIGS. 8A–8E, packets 4-1, 4-2, and 4-3 respectively corresponding to logical channels A, B, and C are multiplexed as ATM cells by means of logical channels and are input to the packet buffer device 1-10. The packet buffer device 1-10 assembles the input ATM cells into packets, and multiplexes and outputs the cells in packet units as cells 4-5, 4-6, and 4-7 corresponding to logical channels X, Y, and Z according to upper layer instructions.

FIG. 8A illustrates packets in each transmission origin, and respective packets are sent from each transmission origin by the logical channels A, B, and C. FIG. 8B represents ATM cells made from individual packets. As shown in FIG. 8B, logical channel A packets are made into cells from leading cell A1 to final cell AE, logical channel B packets are made into cells from leading cell B1 to final cell BE, and logical channel C packets are made into cells from leading cell C1 to final cell CE.

The respective cells A1–AE, B1–BE, and C1–CE are multiplexed and transferred by logical channels, as indicated in FIG. 8C, and the several cells are input to the packet buffer device 1-10 shown in FIG. 8D in the order received.

The packet buffer device 1-10 uses AAL-type 5 protocol payload indication information to recognize a final cell containing packet ending data among the input cells in each logical channel, and the packet buffer device 1-10 extracts an end of message (EOM) packet ending indication signal.

For each logical channel, in addition to carrying out final cell recognition, the packet buffer device 1-10 recognizes the input cell following the final cell as a leading cell containing packet begin data and extracts a beginning of message (BOM) packet begin indication signal.

The packet buffer device 1-10 assembles a packet based on a BOM packet begin indication signal and an EOM packet ending indication signal, organizes cells in respective packet units, performs multiplexing (packet multiplexing), and outputs cells as respective logical channels X, Y, and Z according to instructions from the upper layer.

FIG. 8E represents cells output by packet multiplexing. For cells X0, X1, X2 . . . XE, an example is shown wherein logical channel A packets are converted to logical channel X packets and output. At such time, header cell X0 for a network-internal transfer is added and output is performed, as in a case in which a packet transmitted by a user is transferred within a network.

For cells Y1, Y2 . . . YE, an example is shown wherein logical channel B packets are converted to logical channel Y packets and output, and at such time, output is performed with a header cell unmodified, as in a case in which a packet transmitted from a user is transferred to a user.

For cells Z1 . . . ZE, an example is shown wherein logical channel C packets are converted to logical channel Z packets and output, and at such time, output is performed after deletion of a header cell Z0 (not illustrated) added within a network, as in a case in which a packet is transferred from a network to a user.

Figure 9:
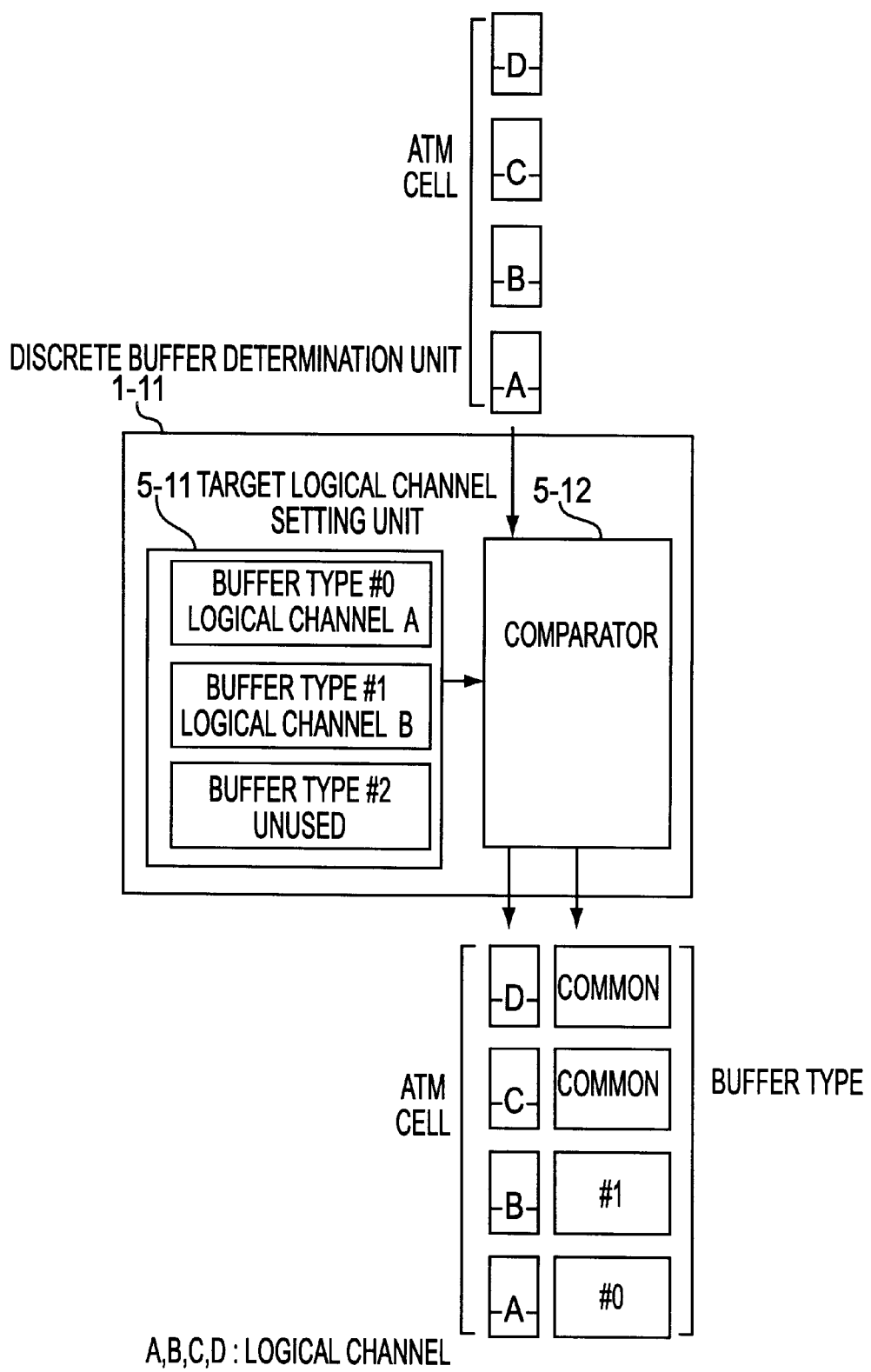
FIG. 9 is a block diagram illustrating buffer type determination by a discrete buffer determination unit in accordance with embodiments of the present invention.
Figure 10:
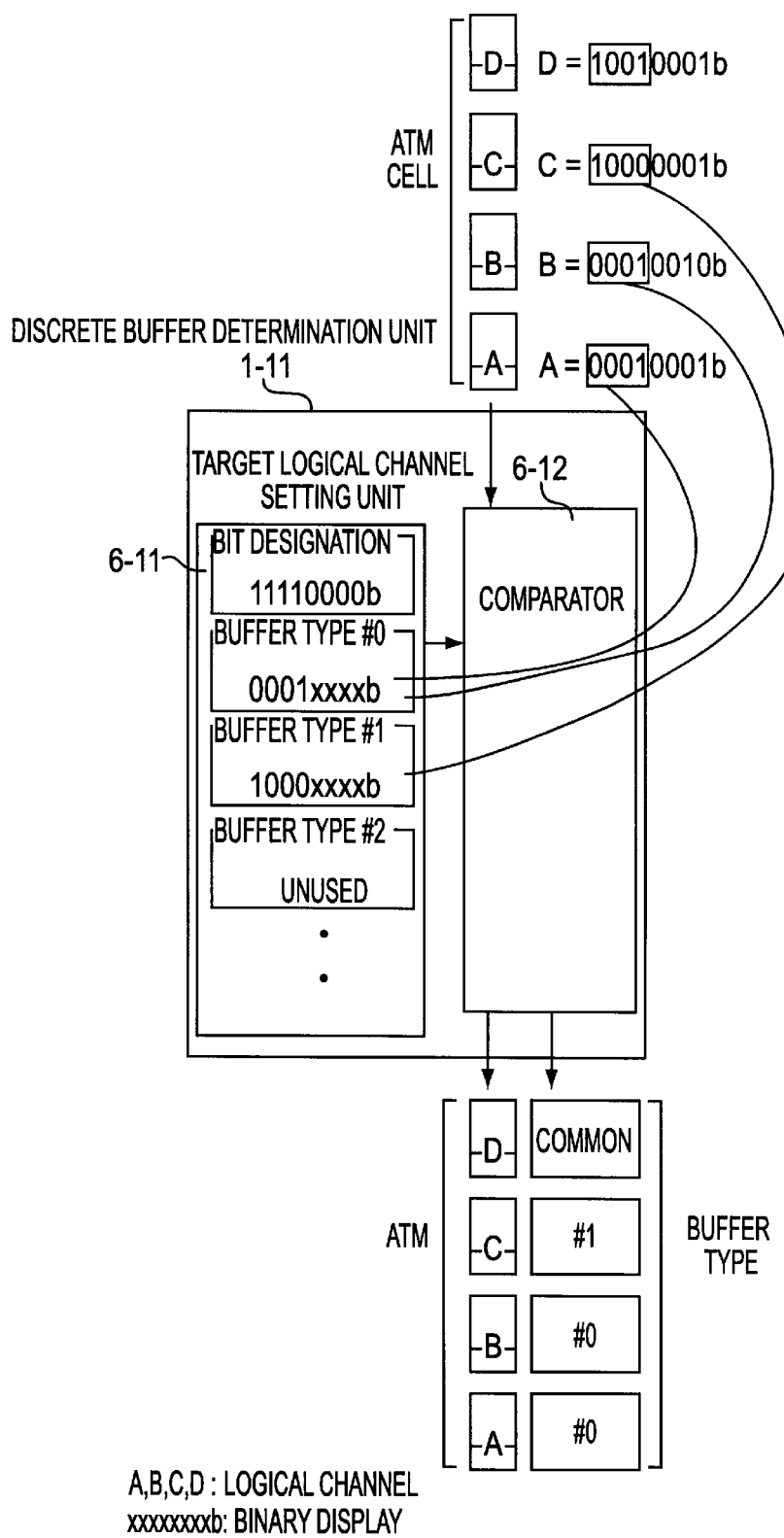
FIG. 10 is a block diagram illustrating buffer type determination by a discrete buffer determination unit in accordance with embodiments of the present invention.
Figure 11:
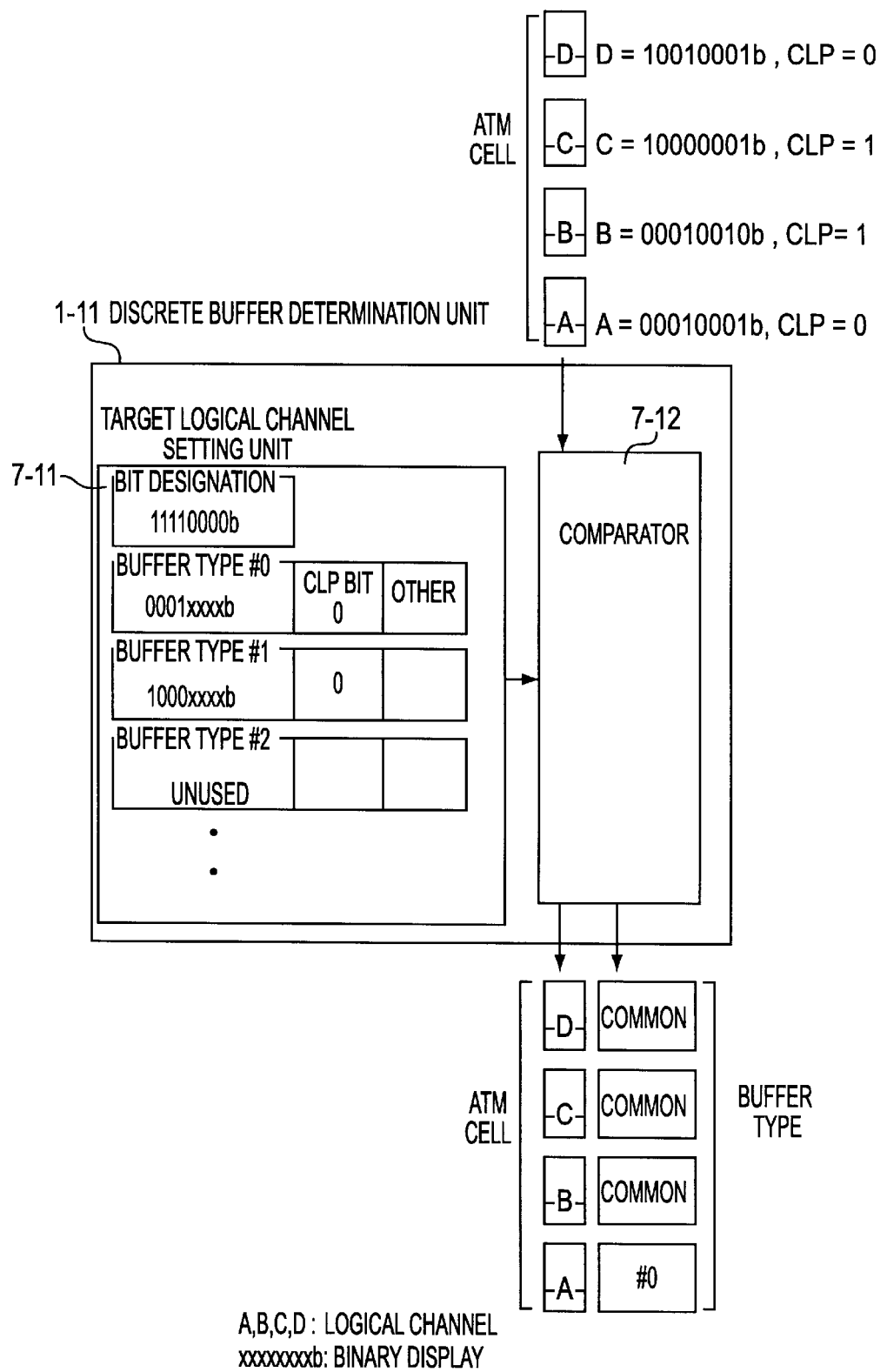
FIG. 11 is a block diagram illustrating buffer type determination by a discrete buffer determination unit in accordance with embodiments of the present invention.

FIG. 9, FIG. 10 and FIG. 11 are block diagrams illustrating buffer type determination by the discrete buffer determination unit 1-11 in accordance with embodiments of the present invention.

FIG. 9 is a block diagram of a discrete buffer determination unit 1-11 which determines buffer type according to the logical channel of an ATM cell. As shown in FIG. 9, the discrete buffer determination unit 1-11 comprises a target logical channel setting unit 5-11 and a comparator 5-12. The target logical channel setting unit 5-11 sets a logical channel that becomes a determination target in correspondence with buffer type (#0, #1, #2 . . . ) of discrete buffers. The comparator 5-12 compares the logical channel number of an ATM cell that is input and the logical channel number set by the target logical channel setting unit 5-11. If there is a match between the logical channel number of the input ATM cell and the target logical channel, the comparator 5-12 outputs buffer type information together with the ATM cell.

In the example shown in FIG. 9, a logical channel A number is set for target logical channel setting unit 5-11 buffer type #0, and a logical channel B number is set for target logical channel setting unit 5-11 buffer type #1. In this instance, when the comparator 5-12 detects matches for logical channel A and logical channel B cells that are input, buffer type information #0 is added to logical channel A cells, and buffer type information #1 is added to logical channel B cells, and the logical channel cells with the buffer type information added thereto are output.

The logical channel number for logical channel C and D cells that are input does not match that set by the target logical channel setting unit 5-11; thus, the comparator 5-12 adds common buffer type information as buffer type information to the logical channel C and D cells and performs output.

FIG. 10 is a block diagram of a discrete buffer determination unit 1-11 which determines buffer type according to a logical channel group in accordance with embodiments of the present invention. As shown in FIG. 10, a target logical channel setting unit 6-11 includes a bit designation unit and a logical channel setting unit which perform respective functions. More specifically, the bit designation unit performs a logical channel number bit designation function. The logical channel setting unit performs a logical channel number setting function which sets a logical channel number for each buffer type (#0, #1, #2 . . . ) corresponding to respective discrete buffer types.

A comparator 6-12 compares a logical channel number associated with an input ATM cell to a logical channel number set by the target logical channel setting unit 6-11, with regard to designation bits (e.g., the upper 4 bits), and if there is a match, the buffer type information corresponding to the logical channel number is output together with the ATM cell.

Such a bit designation function allows multiple logical channel groups to share and use discrete buffers of a single buffer type. In accordance with the embodiment shown in FIG. 10, "11110000" (b: binary display) is set in the bit designation unit, and this designation determines the upper four (4) bits of a target logical channel number.

As shown in FIG. 10, logical channel A and logical channel B which have "0001" as the upper four (4) bits of their logical channel number use buffer type #0, and logical channel C which has "1000" as the upper four (4) bits of its logical channel uses buffer type #1. Logical channel D whose upper four (4) bits do not match any number set in the target logical channel setting unit 6-11 uses a common buffer.

FIG. 11 is a block diagram of a discrete buffer determination unit 1-11 which determines a buffer type according to a logical channel group and cell loss priority indication information in accordance with embodiments of the present invention. As shown in FIG. 11, a target logical channel setting unit 7-11 in the discrete buffer determination unit 1-11 performs logical channel group designation by using the above-described bit designation, and also performs buffer type designation using a cell loss priority indication (CLP) bit. The cell loss priority indication (CLP) bit is in the ATM cell header, and the ATM cell whose CLP bit is set should be discarded with priority when congestion occurs.

A comparator 7-12 compares the logical channel number designation bits and cell loss priority indication (CLP) bits. The structure shown in FIG. 11 allows selective separation of priority cells (packets) and non-priority cells (packets) even within the same logical channel group, and assignment of different buffer types to each.

Figure 8:
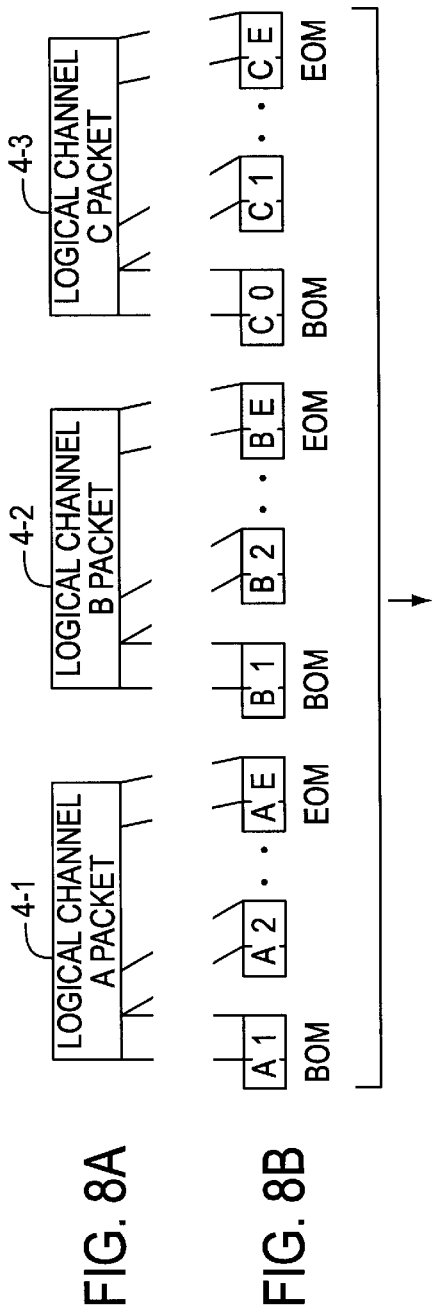
FIGS. 8A, 8B, 8C, 8D and 8E are a descriptive drawing of input data and output data in the packet buffer device in accordance with embodiments of the present invention.

Selective separation of buffer types by comparison of cell loss priority indication (CLP) bits can also be applied to the discrete buffer determination unit shown in FIG. 8 which determines buffer type according to comparison of all bits in a logical channel number.

In accordance with the embodiment of the invention shown in FIG. 11, the designation bits (upper 4 bits) in logical channel A and logical channel B are identical to the settings for buffer type #0 and constitute the same logical channel group. However, the cell loss priority indication (CLP) bit for logical channel B is "1" and does not match the CLP bit value set for buffer type #0, and the common buffer will be used for logical channel B. However, logical channel A does match the cell loss priority indication (CLP) bit set for buffer type #0, and therefore buffer type #0 will be used for logical channel A.

Logical channel C matches the logical channel number designation bits set in buffer type #1, but the cell loss priority indication (CLP) bit does not match, and therefore the common buffer will be used for logical channel C. Logical channel D does not match the logical channel numbers set for either buffer type #0 or #1, and therefore the common buffer will be used for logical channel D.

The present invention is not limited to using a cell loss priority indication (CLP) bit indicating the priority of a cell. For example, a priority bit within a packet header according to the IPv6 (Internet Protocol version 6) pertaining to cell payload contents may also be used. Buffer type may also be determined by combining other information elements, for example, the IP address of an IP packet or the like.

Figure 12:
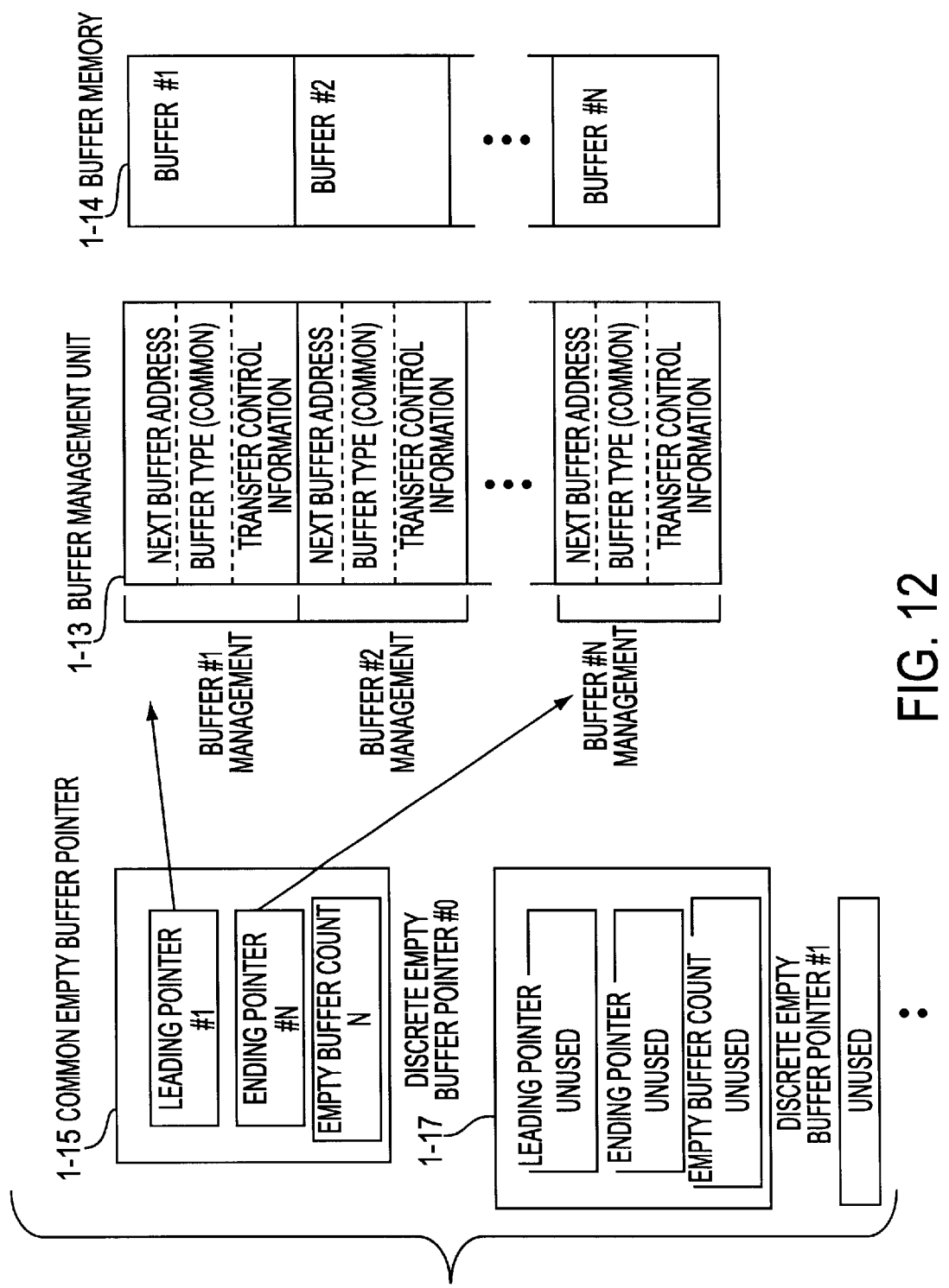
FIG. 12 is a block diagram of the initial state of the packet buffer device in accordance with embodiments of the present invention.
Figure 13:
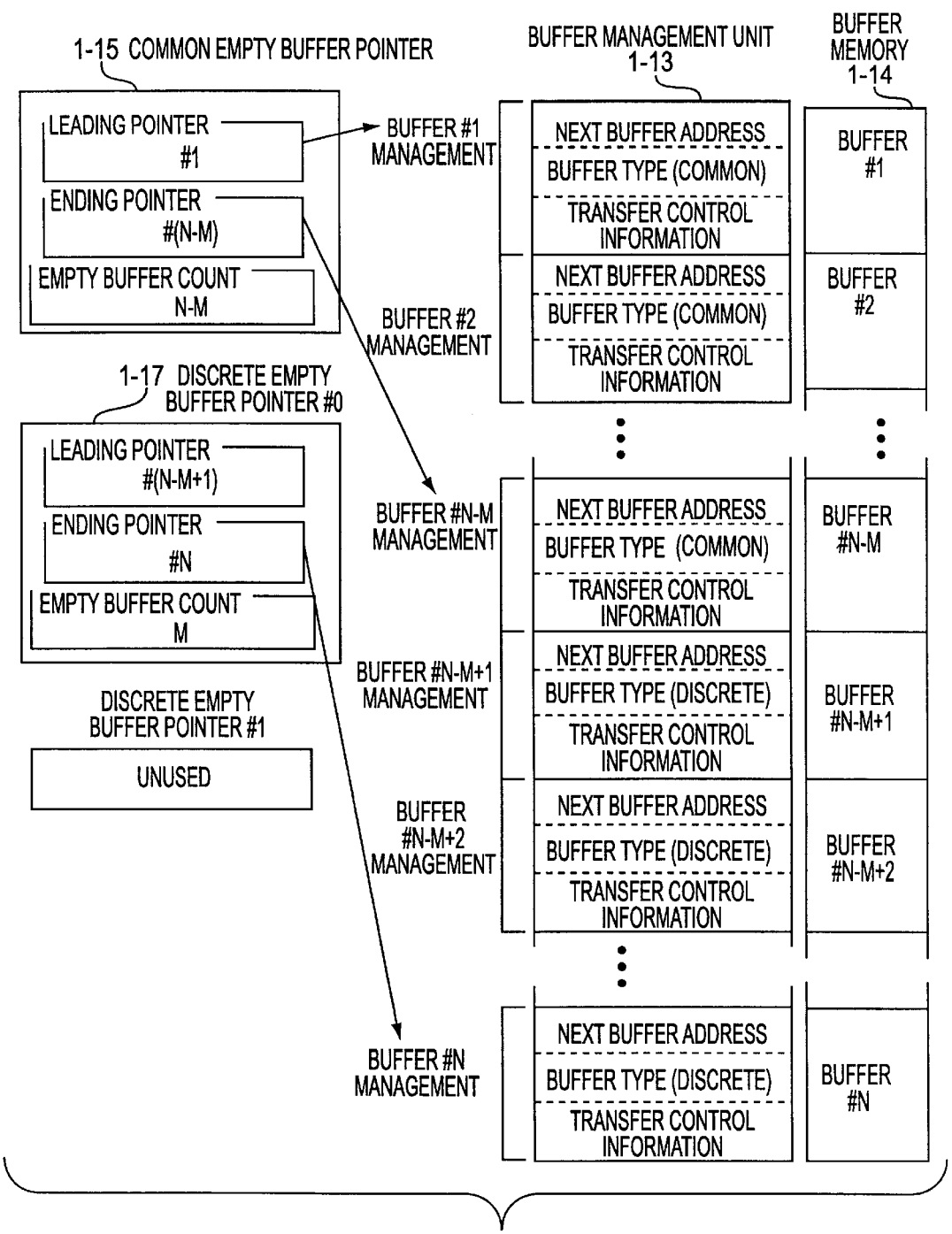
FIG. 13 is a block diagram of the initial state of the packet buffer device in accordance with embodiments of the present invention.

FIG. 12 and FIG. 13 are block diagrams used to describe the initial state of the packet buffer device in accordance with embodiments of the present invention. More particularly, FIG. 12 illustrates an initial state when the buffer memory 1-14 is used only as a common buffer. FIG. 13 illustrates an initial state when the buffer memory 1-14 is divided into a common buffer and discrete buffers.

In each case, the buffer memory 1-14 is provided with n buffer segments #1–#n, and each buffer segment #1–#n has a capacity allowing storage of a 1-cell data portion. Hereinafter, a buffer segment is referred to as simply a buffer.

As shown in FIG. 12, when the buffer memory 1-14 is used as a common buffer, a leading pointer within a common empty buffer pointer 1-15 indicates the leading empty buffer #1, and an ending pointer indicates the trailing empty buffer #n. The empty buffer count is n.

A discrete empty buffer pointer 1-17 for each buffer type (#0, #1 . . . ) has respective areas to store a discrete buffer leading pointer, an ending pointer, and an empty buffer count. However, the example shown in FIG. 12 is an example wherein discrete buffers are not used, and their areas therefore store "Unused" information.

Each buffer #1–#n within the buffer memory 1-14 is managed by a corresponding buffer management unit 1-13, which is provided with memory units corresponding to each buffer that retain a next buffer address, a buffer type, and transfer control information.

The next buffer address indicates a linked buffer address for linking multiple buffer addresses. Multiple buffers are thereby linked sequentially and joined to each other.

The buffer type is information indicating whether the relevant buffer is a common buffer or the type of discrete buffer (#1, #2 . . . #3) the relevant buffer is. The transfer control information includes packet length (buffer length), an upper layer processing complete flag, an output channel number, and header cell addition/deletion information.

An instance in which the buffer memory 1-14 is used as a common buffer and a discrete buffer will now be described below with reference to FIG. 13. FIG. 13 is a block diagram illustrating an example using a discrete buffer of buffer type #0, and among n buffers, m are discrete buffers and the remainder (n−m) are a common buffer.

A leading pointer within the common empty buffer pointer 1-15 indicates buffer #1, an ending pointer indicates buffer #(n−m), and the empty buffer count is thus (n−m). A buffer type #0 leading pointer within the discrete empty buffer pointer 1-17 indicates buffer #(n−m+1), an ending pointer indicates buffer #n, and the empty buffer count is thus m.

Buffer addresses from buffer #1 to buffer #(n−m) are stored in next buffer addresses of the buffer management unit 1-13 to bring about linkage as a common empty buffer, and buffer addresses from buffer #(n−m +1) to buffer #n are stored in next buffer addresses of the buffer management unit 1-13 to bring about linkage as discrete empty buffers.

As a result of these settings, buffer addresses from buffer #1 to buffer #(n−m) are used as a common empty buffer, and buffer addresses from buffer #(n−m+1) to buffer #n are used as discrete buffers. In the example shown in FIG. 13, there is one discrete buffer type; however, a plurality of discrete buffer types can be established as desired using similar procedures.

Figure 14:
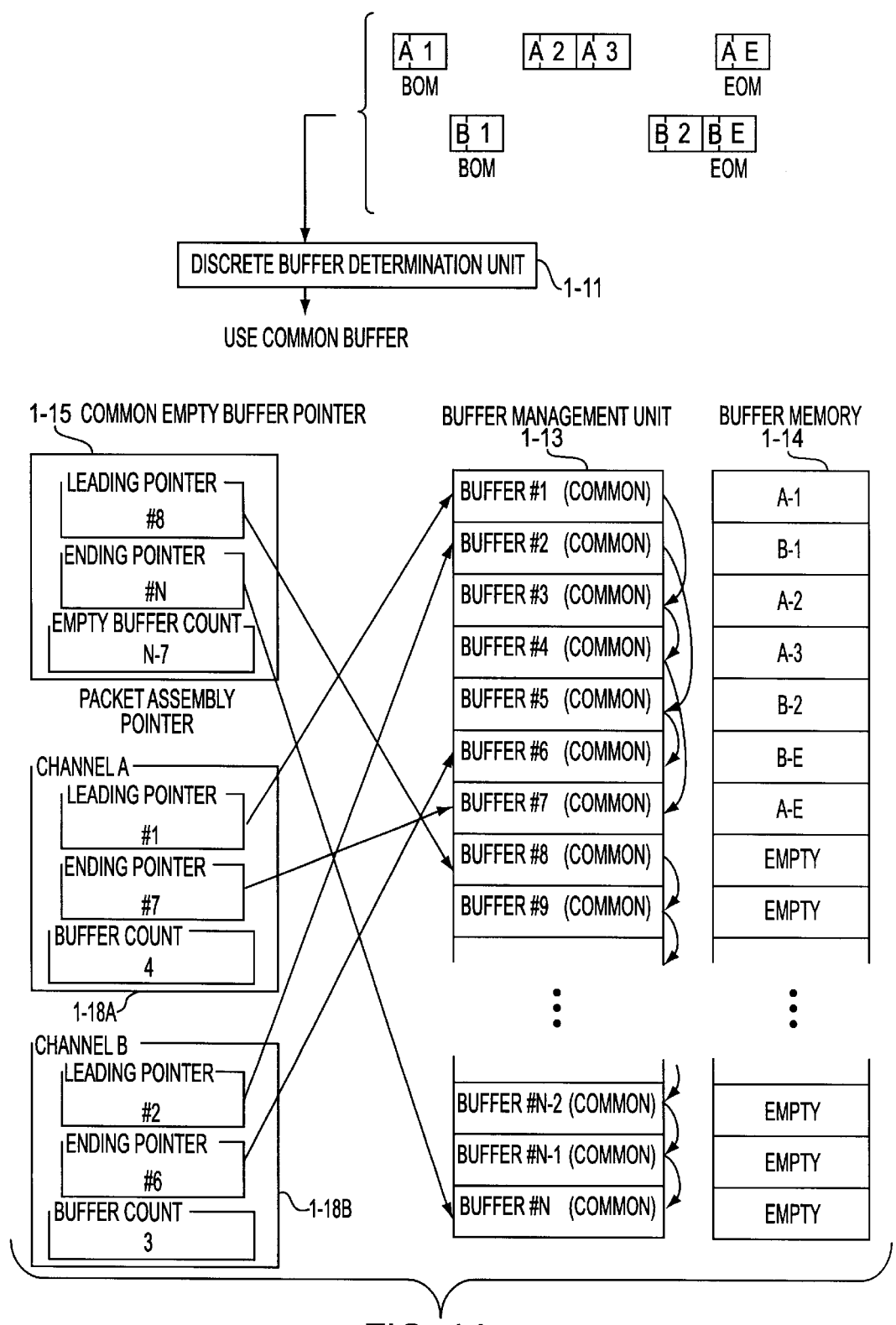
FIG. 14 is a block diagram of buffer structure during packet assembly in accordance with embodiments of the present invention.
Figure 15:
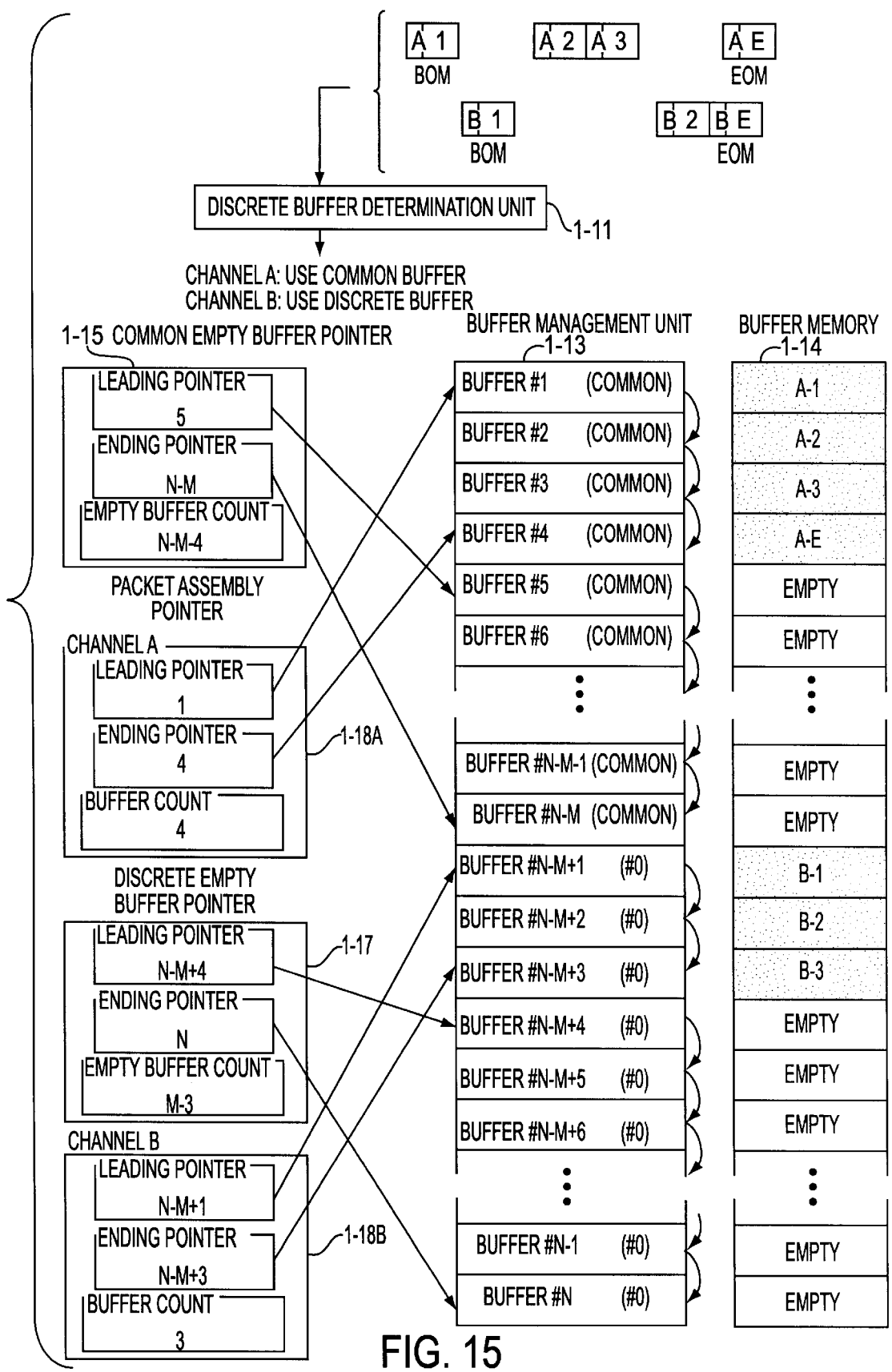
FIG. 15 is a block diagram of buffer structure during packet assembly in accordance with embodiments of the present invention.
Figure 16:
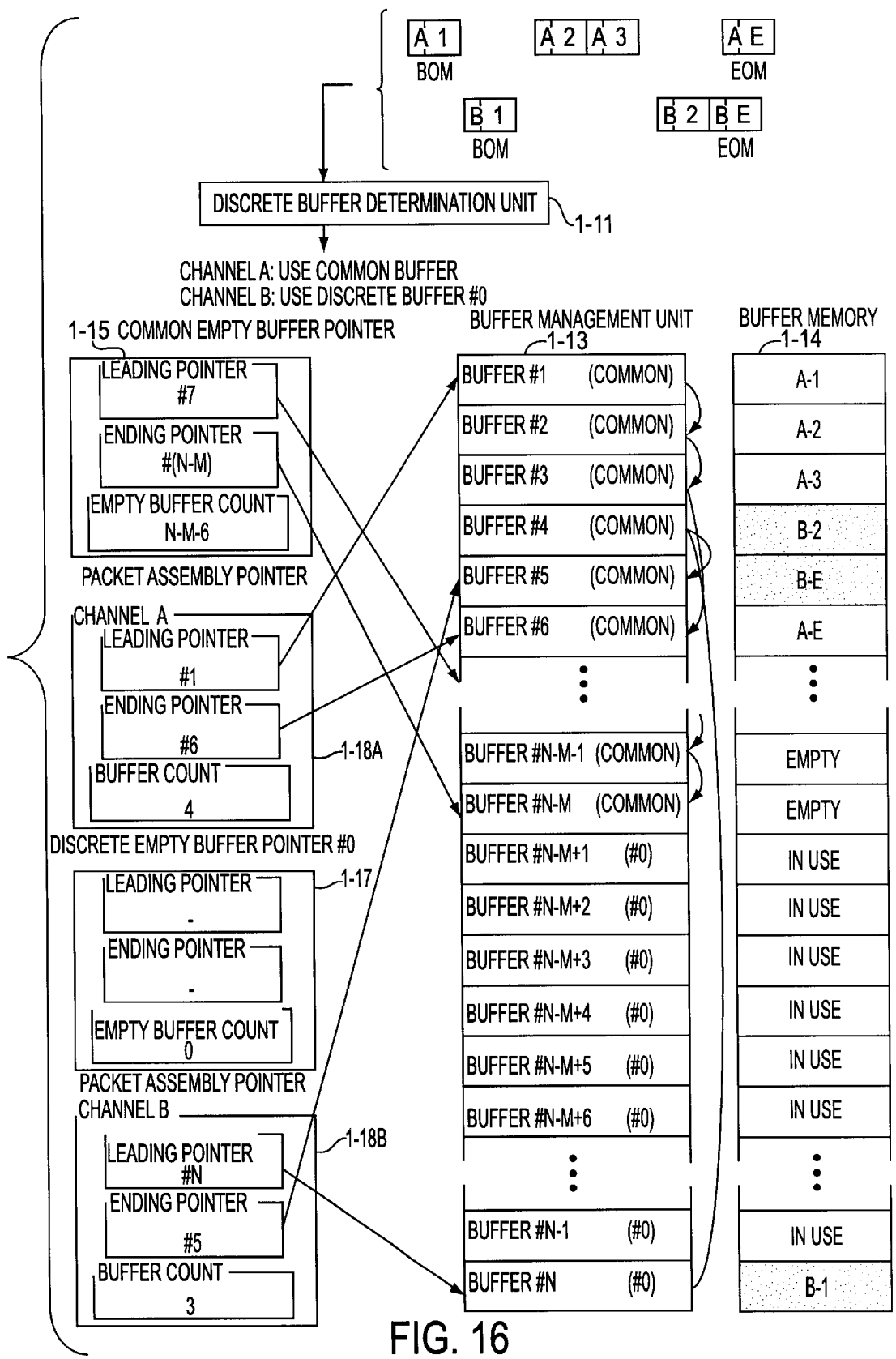
FIG. 16 is a block diagram of buffer structure during packet assembly in accordance with embodiments of the present invention.

FIG. 14, FIG. 15 and FIG. 16 are block diagrams which respectively illustrate a buffer structure during packet assembly in accordance with embodiments of the present invention.

More specifically, FIG. 14 illustrates an example of packet assembly wherein logical channel A and logical channel B use a common buffer. As shown in FIG. 14, logical channel A cells A1, A2, A3, and AE and logical channel B cells B1, B2, and BE arrive at the packet buffer device in the sequence of A1, B1, A2, A3, B2, BE and AE.

The discrete buffer determination unit 1-11 determines that a common buffer will be used for the arriving cells, and a common buffer corresponding to the logical channel of each cell is assigned. In addition, packets are assembled in logical channel units using packet assembly pointers 1-18A and 1-18B corresponding respectively to logical channel A and logical channel B.

The logical channel A packet assembly pointer 1-18A assigns the first empty buffer, buffer #1, to store leading cell A1, and its address is stored in a leading pointer.

The logical channel B packet assembly pointer 1-18B assigns the first empty buffer, buffer #2, to store leading cell B1, and its address is stored in a leading pointer.

To link logical channel A to buffers #1, #3, #4, and #7, which store the subsequently arriving logical channel A cells A2, A3, and AE in order of their arrival, the buffer addresses are respectively stored in the next buffer address area of the buffer management unit 1-13 which corresponds to each buffer. When the final cell then arrives, the address of buffer #7 is stored in the logical channel A packet assembly pointer 1-18A, and "4" is stored in the buffer count.

To link logical channel B to buffers #2, #5, and #6, which store the subsequently arriving logical channel B cells B2, and BE in order of their arrival, the buffer addresses are respectively stored in the next buffer address area of the buffer management unit 1-13 which corresponds to each buffer. When the final cell then arrives, the address of buffer #6 is stored in the logical channel B packet assembly pointer 1-18B, and "3" is stored in the buffer count.

Thus, logical channel A packets use buffers #1, #3, #4, and #7, and logical channel B packets use buffers #2, #5, and #6. The leading pointer in the common empty buffer pointer 1-15 indicates empty buffer leading buffer #8, the ending pointer indicates buffer #n, and the empty buffer count is "n−7".

FIG. 15 illustrates an example of packet assembly wherein logical channel A uses a common buffer and logical channel B uses discrete buffers of buffer type #0. As shown in FIG. 15, the common buffer comprises buffer #1 to buffer #(n−m), and the discrete buffers of buffer type #0 comprise buffer #(n−m+1) to buffer #n.

Logical channel A packets are stored in buffers #1, #2, #3, and #4, and logical channel B packets are stored in buffers #(n−m+1), #(n−m+2), and #(n−m+3).

The leading pointer in the common empty buffer pointer 1-15 indicates buffer #5, the ending pointer indicates buffer #(n−m), and the empty buffer count is "n−m−4". Buffer #5−#(n−m) are linked by next buffer addresses within the buffer management unit 1-13.

The leading pointer within the logical channel A packet assembly pointer 1-18A indicates buffer #1, the ending pointer indicates buffer #4, the buffer count is thus "4", and buffers #1−#4 are linked by next buffer addresses within the buffer management unit 1-13.

The leading pointer within the logical channel B packet assembly pointer 1-18B indicates buffer #(n−m+1), the ending pointer indicates buffer #(n−m+3), the buffer count is thus "3", and buffers #(n−m+1)−#(n−m+3) are linked by next buffer addresses within the buffer management unit 1-13.

The leading pointer within the buffer type #0 discrete empty buffer pointer 1-17 indicates buffer #(n−m+4), the ending pointer indicates buffer #n, and the buffer count is thus "m−3". Buffers #(n−m+4)−#n are linked by next buffer addresses within the buffer management unit 1-13.

FIG. 16 is a block diagram of an example wherein logical channel A uses a common buffer, logical channel B uses a buffer type #0 discrete buffer, and when discrete buffer capacity is insufficient, an empty common buffer is used.

As shown in FIG. 16, (m−1) buffers from buffer #(n−m−1) to #(n−1) are in use within the buffer type #0 discrete buffer possessing m buffers.

Logical channel B packet leading cell B1 is stored in buffer #n, a buffer type #0 discrete buffer. However, because the discrete buffers are used up, the second cell B2 and the third cell BE (final cell) cannot be stored in a discrete buffer, and the common buffer is therefore borrowed for storage.

Common buffer #4 is linked next to discrete buffer #n, second cell B2 is stored in the buffer #4, the common buffer #5 is linked next thereto, and the third cell BE (final cell) is stored in buffer #5.

The leading pointer within the logical channel B packet assembly pointer 1-18B indicates buffer #n, the ending pointer indicates buffer #5, the buffer count is thus "3", and buffers #n, #4, and #5 are linked by next buffer addresses within the buffer management unit 1-13.

Logical channel A cells are stored in common buffers #1, #2, #3, and #6, and these several buffers are linked by next buffer addresses within the buffer management unit 1-13.

The leading pointer within the common empty buffer pointer 1-15 indicates buffer #7, the ending pointer indicates buffer #(n−m), and the empty buffer count is thus (n−m−6). The leading pointer and ending pointer within the discrete empty buffer pointer 1-17 become invalid indications and the empty buffer count is thus "0".

Figure 17:
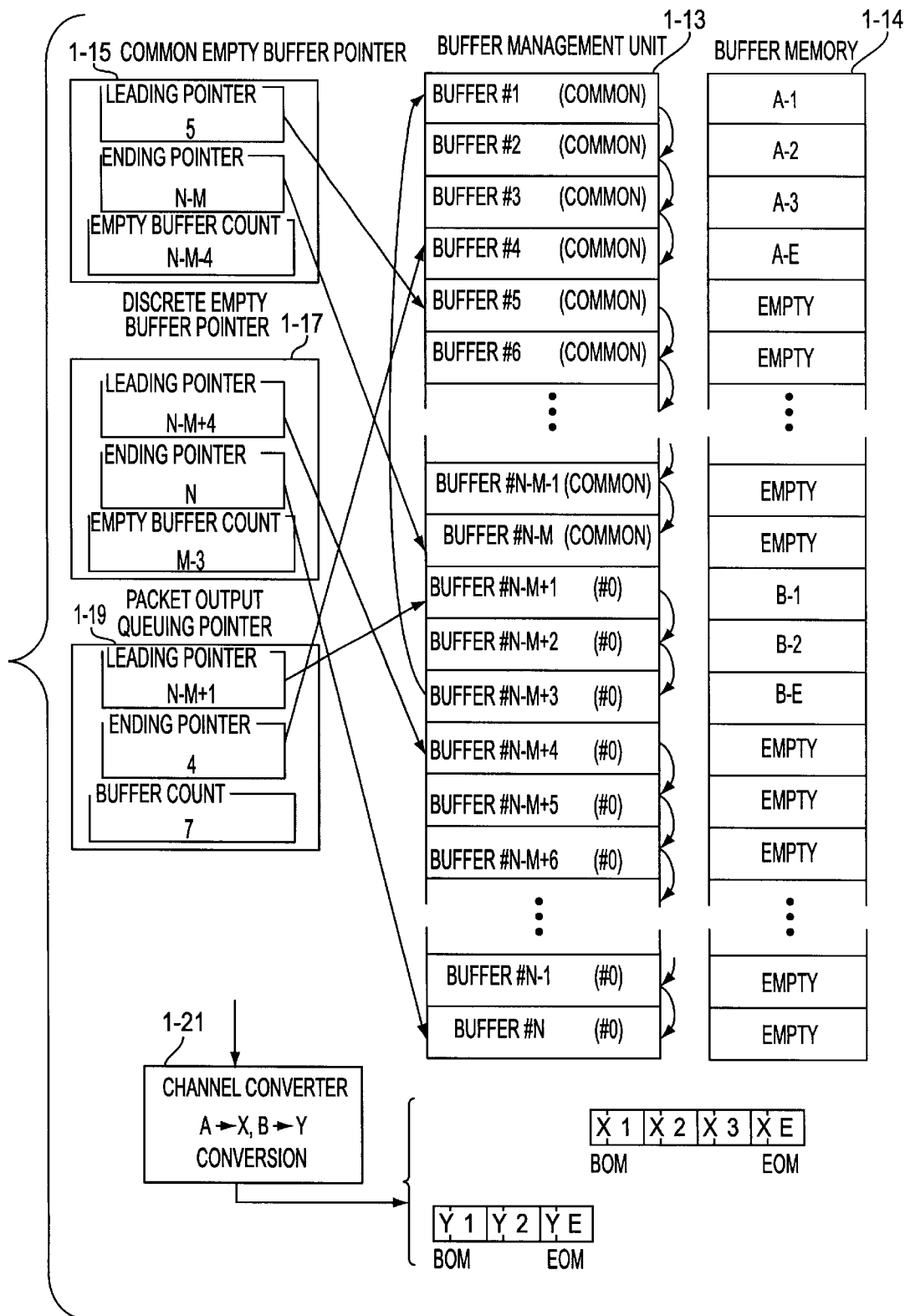
FIG. 17 is a block diagram of buffer structure during packet output in accordance with embodiments of the present invention.

FIG. 17 is a block diagram of a buffer structure during packet output in accordance with embodiments of the present invention. More specifically, FIG. 17 illustrates an instance wherein logical channel B packets are output first, and logical channel A packets are output next.

As shown in FIG. 17, the leading pointer within the packet output queuing pointer 1-19 indicates buffer #(n−m+1), which stores logical channel B packet leading cell data B-1. Next to buffer #(n−m+1), in order, are linked buffer #(n−m+1), #(n−m+2), and #(n−m+3), and next thereto are linked logical channel A buffers #1, #2, #3, and #4.

The ending pointer within the packet output queuing pointer 1-19 indicates buffer #4, which stores logical channel A packet trailing cell data A–E, and the buffer count is "7". Each buffer is linked by a next buffer address within the buffer management unit 1-13.

Instructions from the upper layer are held in a transfer control information unit within the buffer management unit 1-13, and, according to these instructions, channel converter 1-21 converts logical channel A to logical channel X and logical channel B to logical channel Y. Cells are then output in packet units in the order of cells Y1, Y2, YE, X1, X2, X3, and XE.

Figure 18A:
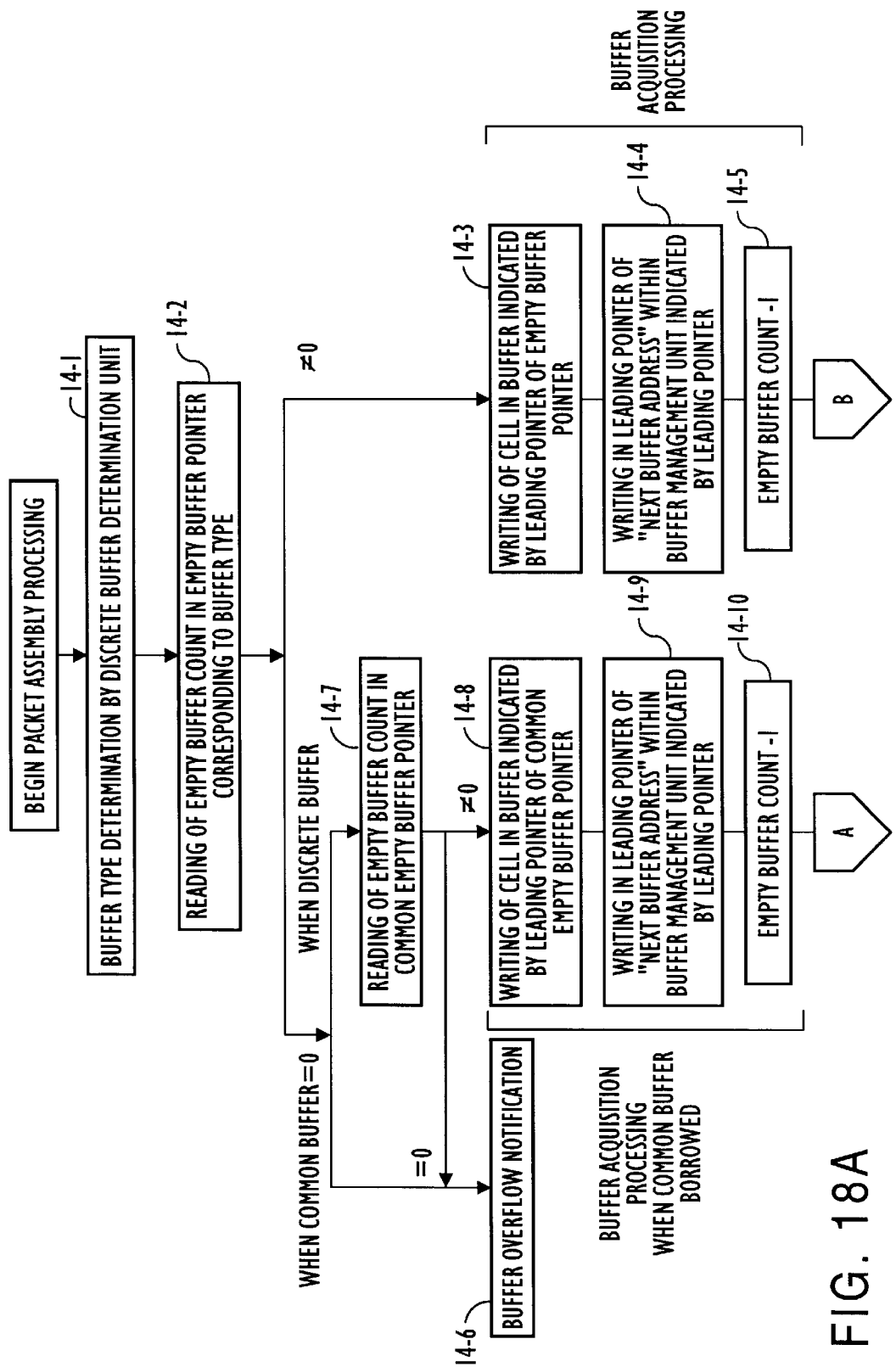
FIGS. 18A and 18B are a flowchart of a buffer control operational process during packet assembly in accordance with embodiments of the present invention.
Figure 18B:
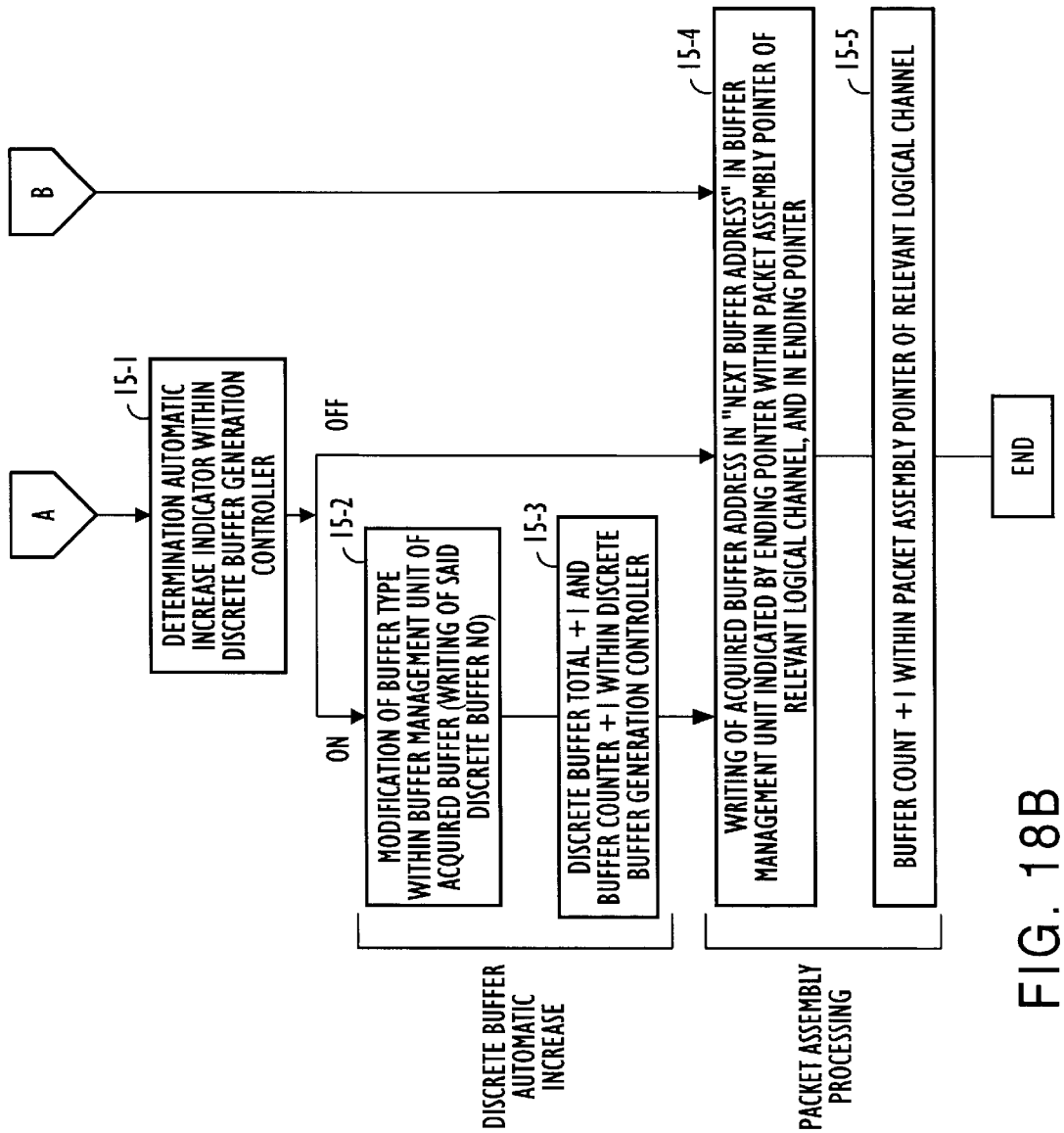

FIGS. 18A and 18B are a flowchart illustrating an operational process for performing buffer control during packet assembly in accordance with the embodiments of the present invention. A buffer control operation during packet assembly will now be described below with reference to the flowcharts in FIGS. 18A and 18B.

As shown in FIG. 18A, buffer type is first determined using information from a discrete buffer determination unit (step 14-1). Next, the empty buffer count within an empty buffer pointer corresponding to the buffer type is read (step 14-2). If the empty buffer count is not "0", buffer acquisition processing entails reading of the leading pointer within the empty buffer pointer and writing of cell data in the buffer indicated by the leading pointer (step 14-3), writing the next buffer address within the buffer management unit, indicated by the leading pointer, to the leading pointer within the empty buffer pointer (step 14-4), and reducing the empty buffer count by one (−1) (step 14-5).

If the empty buffer count is "0" and the buffer type thereof is "common buffer", buffer overflow notification processing is carried out (step 14-6), and, if the buffer type is "discrete buffer", the empty buffer count of the common empty buffer counter is read (step 14-7). If the empty buffer count of the common empty buffer counter is "0", buffer overflow notification processing is carried out (step 14-6).

If the empty buffer count of the common empty buffer counter is not "0", a common buffer will be borrowed, and buffer acquisition processing for borrowing entails writing of cell data to the buffer indicated by the leading pointer of the common empty buffer pointer (step 14-8), writing the next buffer address within the buffer management unit, indicated by the leading pointer, to the leading pointer of the common empty buffer pointer (step 14-9), and reducing the empty buffer count by one (−1) (step 14-10).

Whether to increase the discrete buffer count with borrowed common buffer as a discrete buffer, or whether to leave the borrowed common buffer unmodified is determined by an automatic increase indicator within a discrete buffer generation controller described hereafter (step 15-1). In a case where increase of the discrete buffer count is indicated, discrete buffer automatic increase processing entails rewriting the buffer type within the buffer management unit corresponding to the acquired buffer with a discrete buffer type designated by the discrete buffer determination unit (step 15-2), and respectively increasing the discrete buffer total and a buffer count counter within a discrete buffer generation controller, described hereinafter, by one (+1) (step 15-3).

Following the above-described buffer acquisition processing and discrete buffer automatic increase processing, packet assembly processing entails writing the acquired buffer address to a next buffer address in the buffer management unit corresponding to the buffer indicated by the ending pointer within the packet assembly pointer for the relevant logical channel, and also writing the acquired buffer address to the ending pointer within the packet assembly pointer (step 15-4), increasing the buffer count within the packet assembly pointer for the relevant logical channel by one (+1) (step 15-5), and ending packet assembly processing.

Figure 19A:
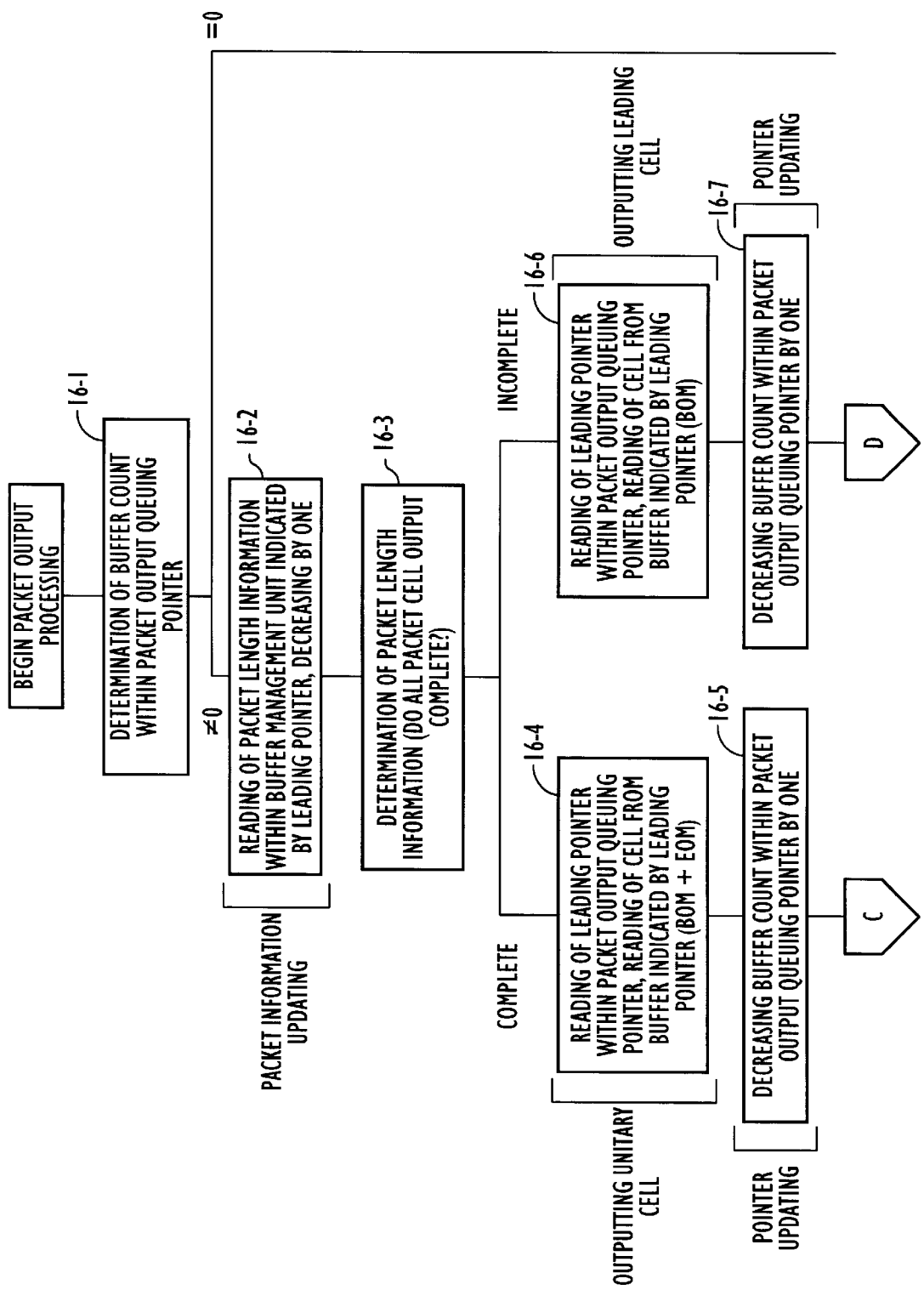
FIGS. 19A and 19B are a flowchart of a buffer control operational process during packet output in accordance with embodiments of the present invention.
Figure 19B:
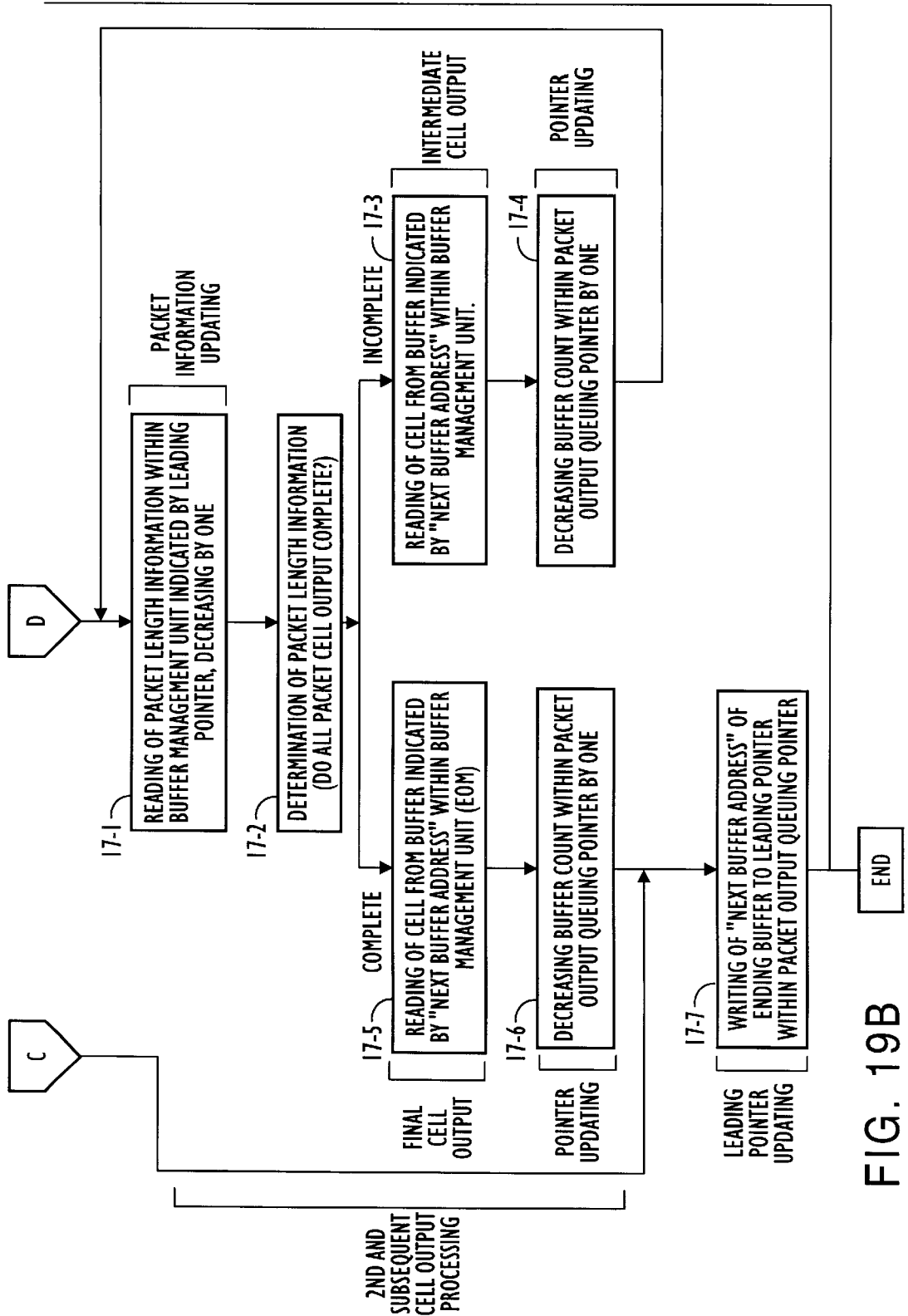

FIGS. 19A and 19B illustrate a flowchart of a buffer control operational process during packet output in accordance with embodiments of the present invention. Buffer control operation during packet output will now be described with reference to the flowcharts of FIGS. 19A and 19B.

The buffer count within a packet output queuing pointer is first read, and it is determined whether or not output-queued packets are present (step 16-1). If output-queued packets are present (output queuing buffer count not equal to 0), the packet length of a transfer control information unit within a buffer management unit, indicated by the leading pointer within the packet output queuing pointer, is read, and its value decreased by one (−1) (step 16-2).

Packet length is determined according to the result of the subtraction (step 16-3). If the result is "0", the packet is a packet comprising one cell. Packet output is complete when the cell is output. Unitary cell output processing entails reading the leading pointer within the packet output queuing pointer, reading and outputting the cell from the buffer indicated by the leading pointer, and outputting a packet begin indication (BOM) signal and a packet end indication (EOM) signal (step 16-4).

Pointer update processing for the packet output queuing pointer entails subtracting one (−1) from the buffer count within the packet output queuing pointer (step 16-5), a next buffer address within the buffer management unit corresponding to the final buffer of the packet (i.e., the cell buffer) is written to the leading pointer within the packet output queuing pointer (step 17-7), and output processing ends.

In the above-described packet length determination step (step 16-3), leading cell output processing when the subtraction result is not "0", i.e., when a packet comprises multiple cells, entails reading and outputting a cell from the buffer indicated by the leading pointer within the packet output queuing pointer, and outputting a packet begin indication (BOM) signal (step 16-6), and pointer update processing entails subtracting one (−1) from the buffer count within the packet output queuing pointer (step 16-7).

In operation of outputting a second and subsequent cells, one is again subtracted (−1) from the control unit packet length within the buffer management unit, indicated by the leading pointer within the packet output queuing pointer (step 17-1), and packet length information is determined (step 17-2). If packet sending is not complete, a cell is read and output from the buffer indicated by the "next buffer address" within the buffer management unit, from which prior output took place (step 17-3), and one is subtracted (−1) from the buffer count within the packet output queuing pointer (step 17-4). Because this case involves an intermediate cell, neither a packet begin indication (BOM) signal nor a packet end indication (EOM) signal is output.

If the control unit packet length within the buffer management unit, indicated by the leading pointer within the packet output queuing pointer, is "0", i.e., if packet output is complete, a cell is read and output from the buffer indicated by the "next buffer address" within the buffer management unit, from which prior output took place, and a packet end indication (EOM) signal is output (step 17-5). Then, one is subtracted (−1) from the buffer count within the packet output queuing pointer (step 17-6), the "next buffer address" within the buffer management unit corresponding to the final buffer of the packet is written to the leading pointer within the packet output queuing pointer (step 17-7), and output processing ends.

Figure 20:
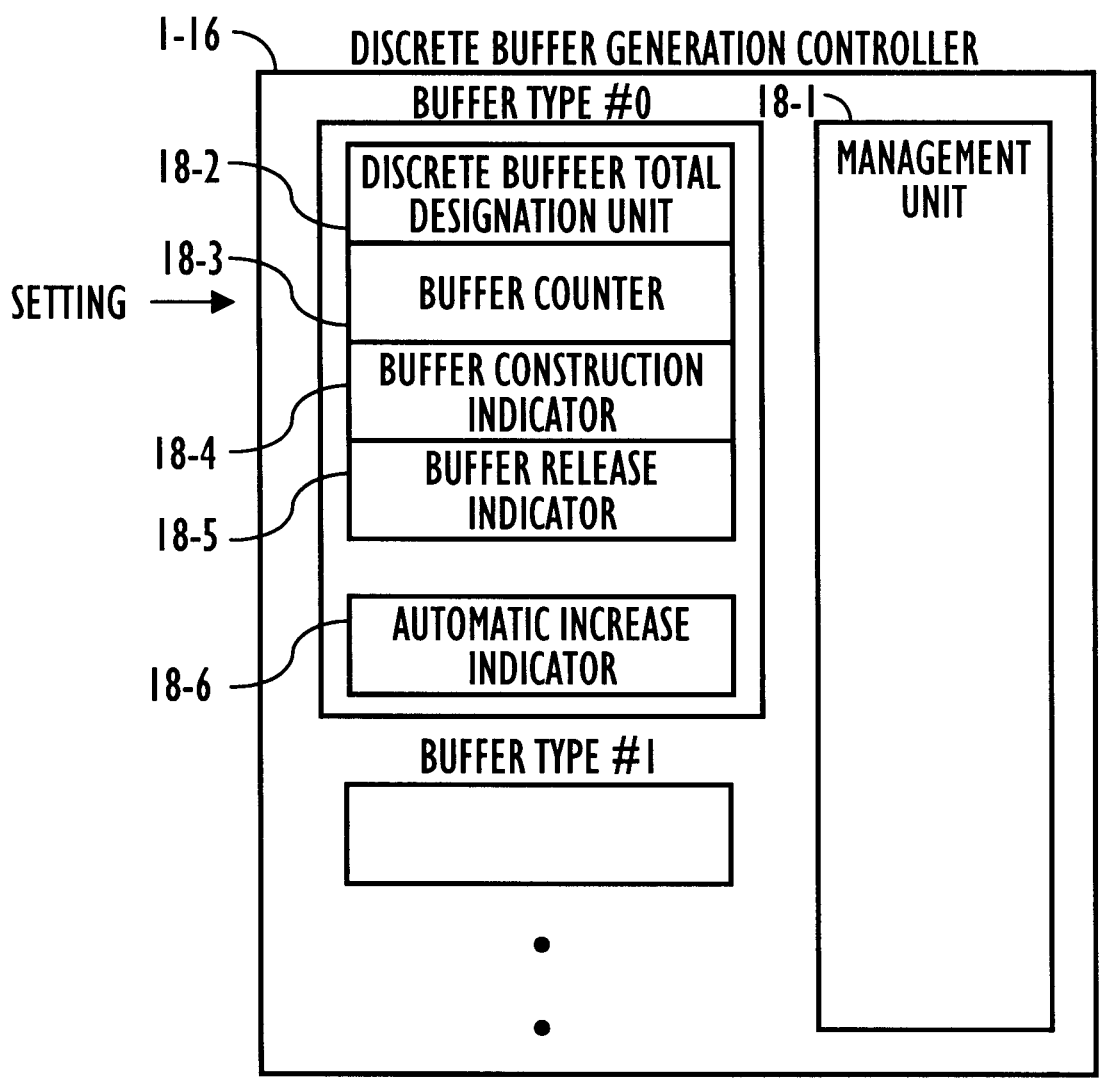
FIG. 20 is a block diagram illustrating a structure of a discrete buffer generation controller in accordance with embodiments of the present invention.

FIG. 20 is a block diagram of the discrete buffer generation controller in accordance with embodiments of the present invention. The discrete buffer generation controller 1-15 includes a management unit 18-1 to manage the entire unit, a discrete buffer total designation unit 18-2 to designate a discrete buffer total for each buffer type, a buffer counter 18-3 used by the management unit 18-1 during buffer construction, a buffer construction indicator 18-4 to indicate buffer construction, a buffer release indicator 18-5 to indicate buffer release, and an automatic increase indicator 18-6 to indicate whether an acquired buffer is to be added as a discrete buffer without reversion to a common buffer when a buffer is acquired by borrowing from a common buffer as described in FIG. 18A.

Figure 21:
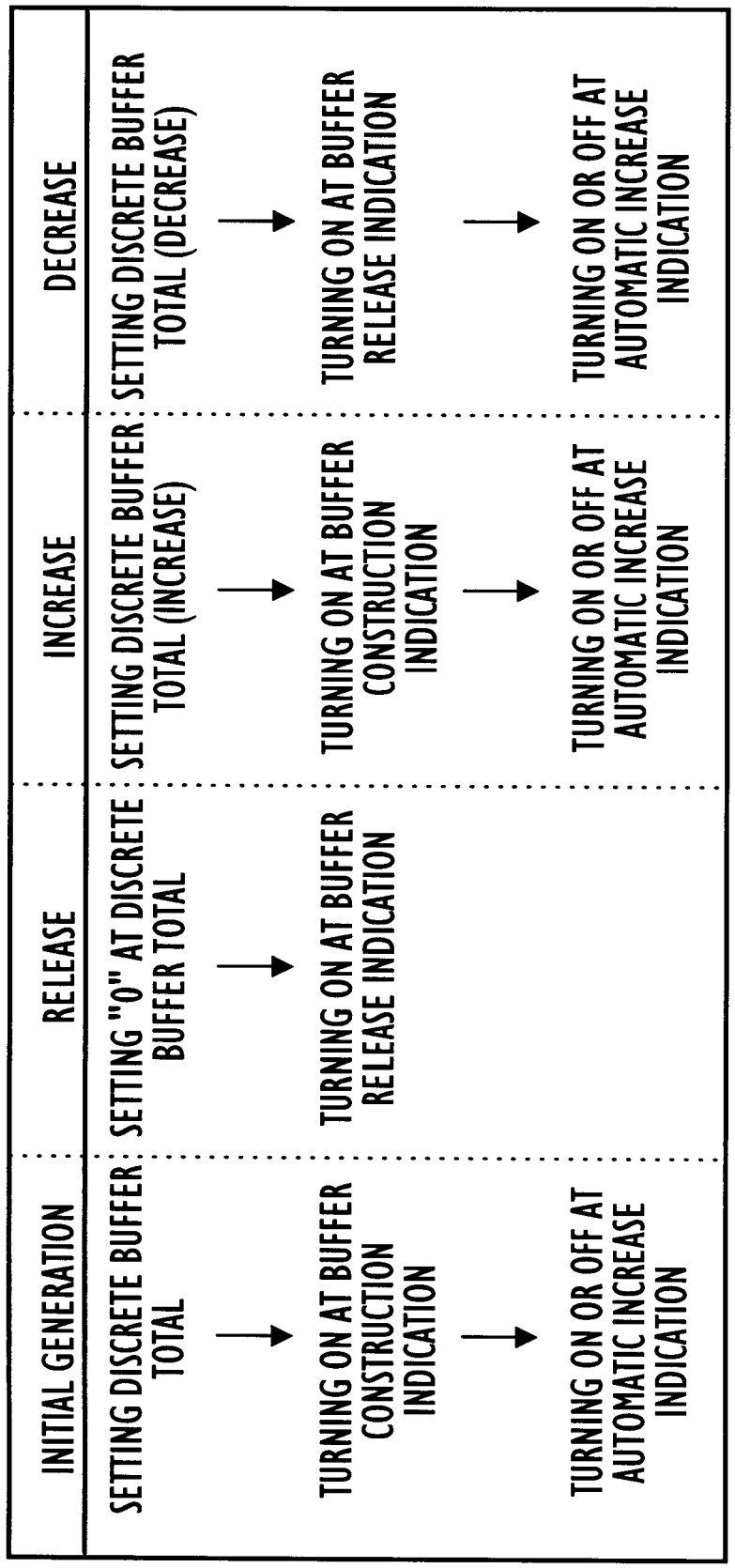
FIG. 21 is a block diagram illustrating setting procedures in the discrete buffer generation controller in accordance with embodiments of the present invention.

FIG. 21 is a diagram illustrating setting procedures in the discrete buffer generation controller 1-16 in accordance with embodiments of the present invention. During initial generation of a discrete buffer, a microprogram or the like sets a discrete buffer total, the buffer construction indication is turned on, and the automatic increase indication is turned on or off.

When discrete buffers are all released and made a common buffer, the discrete buffer total is set to "0", and the buffer release indication is turned on.

When the buffer capacity of a currently existing discrete buffer is increased, the discrete buffer total is set to the increased total, the buffer construction indication is turned on, and the automatic increase indication is turned on or off.

When the buffer capacity of a currently existing discrete buffer is reduced, the discrete buffer total is set to the reduced total, the buffer release indication is turned on, and the automatic increase indication is turned on or off.

Figure 22A:
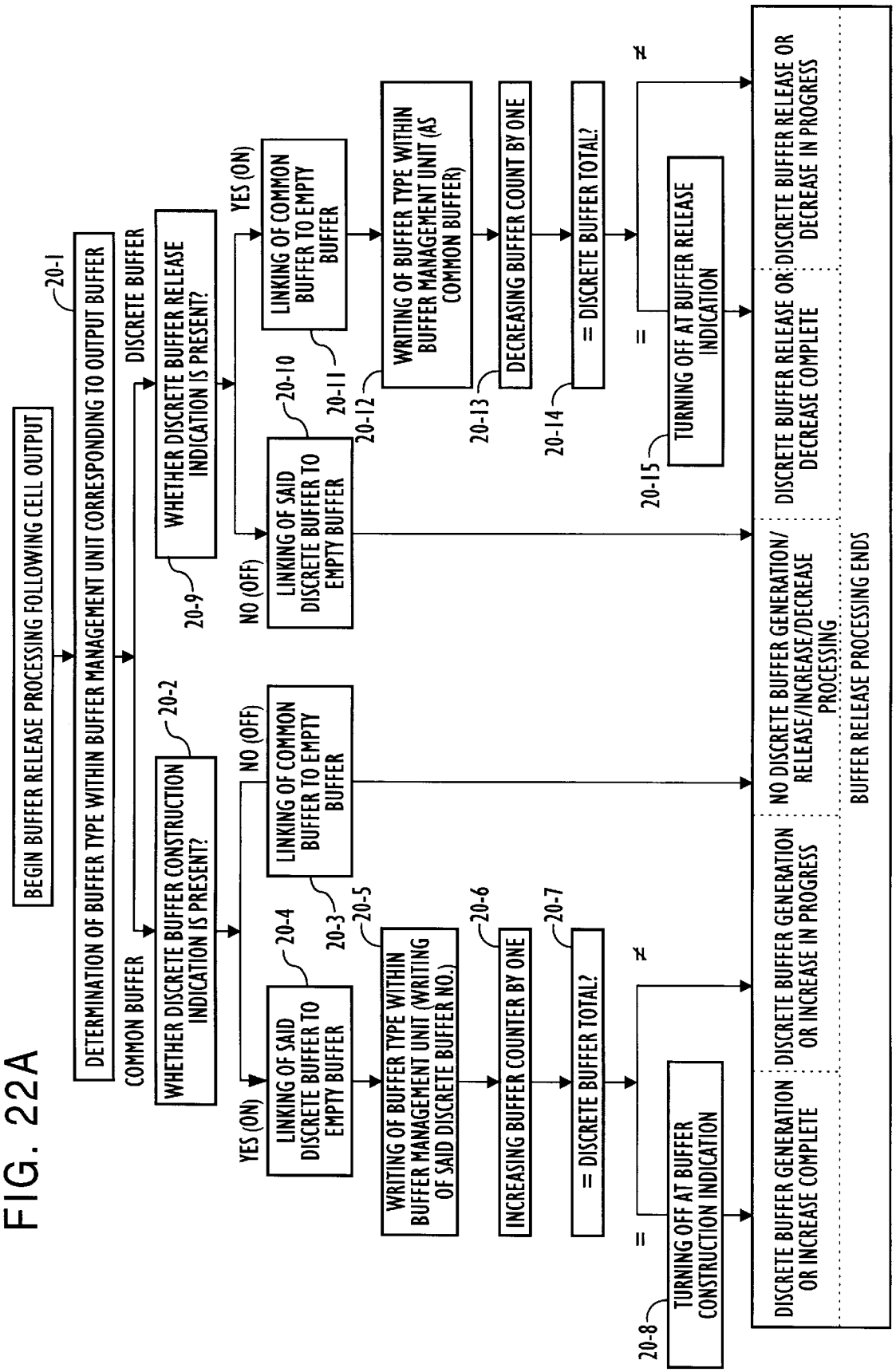

FIGS. 22A and 22B are flowcharts of an operational process performed by the management unit within the discrete buffer generation controller in accordance with embodiments of the present invention. FIG. 22A illustrates the operation of buffer release processing following cell output. FIG. 22B illustrates the operation of processing for linking to an empty buffer.

As shown in FIG. 22A, the buffer type within a buffer management unit corresponding to a buffer output by packet output processing is determined (step 20-1). If the buffer type is "common buffer", whether a discrete buffer construction indication is currently present ("ON") is determined (step 20-2). If the discrete buffer construction indication is not present ("OFF"), linking to a common empty buffer is performed without further action (step 20-3), and buffer release processing ends without performance of discrete buffer generation, release, or increase/decrease processing.

If a discrete buffer construction indication is present ("ON"), discrete buffer generation or addition takes place, and linking to a discrete empty buffer where construction is indicated is performed (step 20-4). Then, the buffer type within the buffer management unit of the linked buffer is rewritten to "discrete buffer" (step 20-5), and the buffer counter is increased by one (+1) (step 20-6). It is then determined whether the result of increasing the buffer counter by one in step 20-6 is now the number set in the discrete buffer total (step 20-7). If this number is equal to the discrete buffer total, the buffer construction indication is turned off (step 20-8), discrete buffer generation or addition is complete, and buffer release processing ends. If the number is not the same as the total, discrete buffer generation or addition continues.

If the output buffer type (step 20-1) is "discrete buffer", it is then determined whether a discrete buffer release indication is currently present (step 20-9). If a discrete buffer release indication is not currently presented, linking to the discrete empty buffer takes place without further action (step 20-10), and buffer release processing ends without performance of discrete buffer generation, release, or increase/decrease processing.

If a discrete buffer release indication is present, discrete buffer release or decrease takes place, and linking to a common empty buffer is performed (step 20-11). Then, the buffer type within the buffer management unit of the linked buffer is rewritten to "common buffer" (step 20-12), and the buffer counter is decreased by one (−1) (step 20-13). Next, it is determined whether the buffer count number is now the number set in the discrete buffer total (step 20-14). If the buffer count number is equal to the discrete buffer total, the buffer release indication is turned off (step 20-15), discrete buffer release or decrease processing is complete, and buffer release processing ends. If the buffer count number is not the same as the discrete total, discrete buffer release or decrease processing continues.

An operational process for linkage to an empty buffer will now be described with reference to FIG. 22B. The empty buffer count held in the empty buffer pointer of the empty buffer to be linked is determined (step 21-1). If the count is "0", the address of the buffer to be linked is written to the leading pointer and the ending pointer (step 21-2), the empty buffer count is increased by one (+1) (step 21-3), and processing ends.

If the empty buffer count is not "0", the ending pointer of the empty buffer pointer is read (step 21-4), the address of the buffer to be linked is written to the ending pointer and the "next address" within the buffer management unit of the buffer indicated by the ending pointer (21-5), the empty buffer count is increased by one (+1) (step 21-6), and processing ends.

Figure 23:
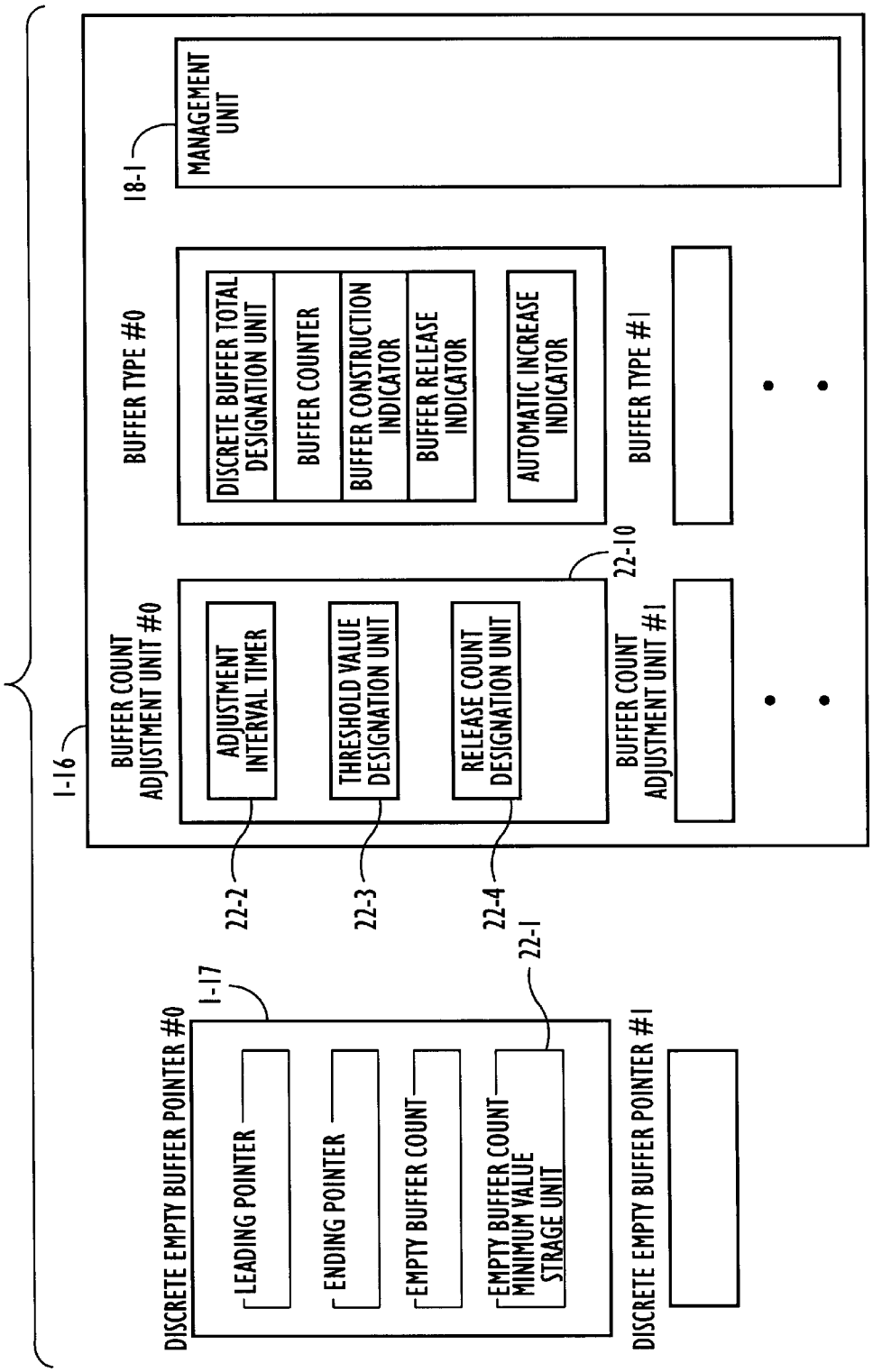
FIG. 23 is a block diagram illustrating a discrete empty buffer pointer and a discrete buffer generation controller to optimize individual buffer count in accordance with embodiments of the present invention.
Figure 24:
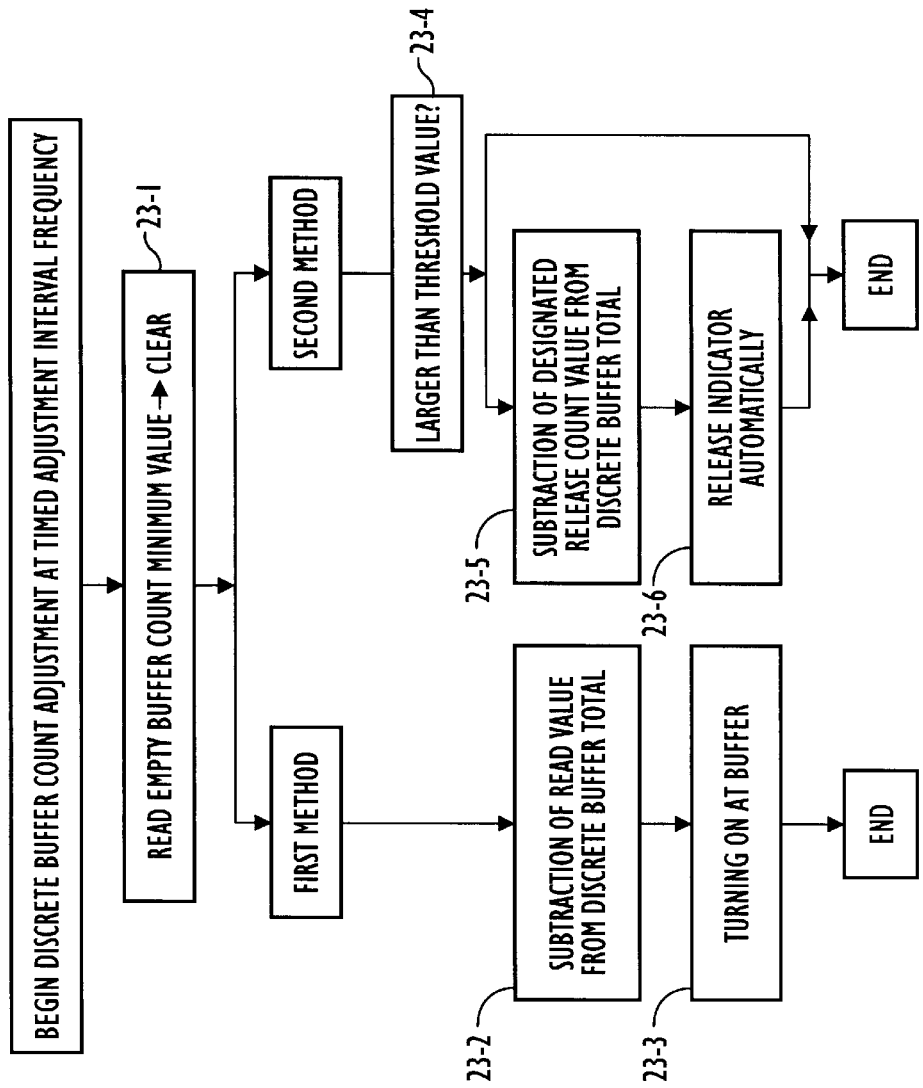
FIG. 24 is a flow chart illustrating an operational process using a discrete empty buffer pointer and a discrete buffer generation controller to optimize individual buffer count in accordance with embodiments of the present invention.

FIG. 23 and FIG. 24 are block diagrams of a discrete empty buffer pointer 1-17 and a discrete buffer generation controller 1-16 to optimize the discrete buffer count in accordance with embodiments of the present invention. FIG. 23 illustrates the structure of the discrete empty buffer pointer 1-17 and the discrete buffer generation controller 1-16. FIG. 24 is a flow chart illustrating operations in a management unit therein.

As shown in FIG. 23, an empty buffer count minimum value storage unit 22-1 is provided within the discrete empty buffer pointer 1-17 and stores a minimum value as indicated by the minimum value of an empty buffer count.

The discrete buffer generation controller 1-16 also includes a buffer count adjustment unit 22-10 including an adjustment interval timer 22-2 to set a period intended to optimize a buffer count corresponding to discrete buffers of each buffer type, a threshold value designation unit 22-3 used to determine the empty buffer count minimum value and to decide whether optimization is achieved, and a release count designation unit 22-4 which designates a buffer count released when optimization is achieved.

The operation of a management unit within the discrete buffer generation controller 1-16 intended to optimize discrete buffer count is described with reference to the flowchart in FIG. 24. The minimum value stored in the empty buffer count minimum value storage unit 22-1 within the discrete empty buffer pointer 1-17 is read at a frequency determined by the adjustment interval timer 22-2, and the value stored in the empty buffer count minimum value storage unit 22-1 is cleared in each cycle in order to perform determination (step 23-1).

A first method of optimizing the discrete buffer count includes adopting the empty buffer count minimum value thus read as an excess buffer count, subtracting this value from a discrete buffer total designation value (step 23-2), and turning a buffer release indication on (step 23-3).

A second method thereof includes comparing the empty buffer count minimum value thus read to the value set in the threshold value designation unit 22-3 without adopting an excess buffer count (step 23-4), ending processing without further action if the empty buffer count minimum value is smaller than the threshold value, subtracting the value set by release count designation unit 22-4 from the discrete buffer total designation value if the empty buffer count minimum value is larger than the threshold value (step 23-5), and turning the buffer release indication on (step 23-6).

As described hereinabove, in accordance with embodiments of the present invention a common buffer and discrete buffers are dynamically constructed and buffers of respectively differing type are used for packets of differing service mode. The present invention thereby offers a transfer service suited to various service modes, wherein buffer usage status is unaffected by the packets of a given subscriber even when the service accommodates subscribers of differing service modes in a mixed fashion entailing shared buffer service by multiple subscribers and dedicated buffer service only for specific subscribers.

In accordance with embodiments of the present invention, the efficiency of buffer resource usage by discrete buffers and a common buffer is improved by affording modification according to settings whereby, when given discrete buffers converge and their capacity is insufficient, part of a common buffer is incorporated into discrete buffers, and the part of the common buffer is used as discrete buffers without modification or returned to the common buffer.

In accordance with embodiments of the present invention, optimal buffer resource usage is achieved by monitoring the number of each type of the discrete buffers used at a predetermined interval, modifying the allotment for each type of discrete buffer according to actual usage, and optimizing the number of each type of discrete buffer.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A packet buffer device to store ATM cells multiplexed and input via multiple logical channels, and to assemble ATM cells corresponding to each logical channel into packets in a buffer, comprising:

a discrete buffer controller to generate a discrete buffer from a common buffer;

a buffer type determination unit to determine a buffer type to store an ATM cell for each input ATM cell;

a packet buffer controller to assign the ATM cell to the common buffer or to the discrete buffer according to the buffer type, wherein the packet buffer controller acquires a buffer from an empty buffer of a common buffer in response to determining that there is no empty discrete buffer to acquire, and performs control of packet assembly, and wherein the packet buffer controller further comprises a device to assess a discrete buffer increase indication from the discrete buffer controller, to rewrite a buffer type within the buffer management unit corresponding to a buffer acquired from an empty buffer of a common buffer to a buffer type designating a relevant discrete buffer in response to the discrete buffer increase indication, and to modify several buffers acquired from a common buffer to discrete buffers.

2. The packet buffer device as recited in claim 1, wherein the discrete buffer controller releases the discrete buffer to the common buffer after an assembled packet is output.

3. The packet buffer device according to claim 1, wherein the buffer type determination unit further comprises:

a target logical channel setting unit to set a correspondence between buffer type information designating a discrete buffer or a common buffer and an ATM cell logical channel; and a comparator to compare the logical channel of an input ATM cell and the ATM cell logical channel, and to output the buffer type information corresponding to the logical channel of the input ATM cell.

4. The packet buffer device according to claim 3, wherein the target logical channel setting unit includes bit designation information to designate a logical channel determination target bit set for each discrete buffer type, and wherein the comparator compares a logical channel determination target bit for an input ATM cell to the logical channel determination target bit designated by the bit designation information, and outputs the buffer type information designating a discrete buffer type when there is a match, and outputs buffer type information designating a common buffer when there is not a match.

5. The packet buffer device according to claim 3, wherein the target logical channel setting unit includes priority degree information to indicate the degree of priority of an ATM cell or a packet for each discrete buffer type, and wherein the comparator compares information indicating the priority degree of an input ATM cell or a packet and priority degree information indicating the degree of priority, and outputs the buffer type information according to the result of the comparison.

6. The packet buffer device according to claim 4, wherein the target logical channel setting unit includes priority degree information to indicate the degree of priority of an ATM cell or a packet for each discrete buffer type, and wherein the comparator compares information indicating the priority degree of an input ATM cell or a packet and priority degree information indicating the degree of priority, and outputs the buffer type information according to the result of the comparison.

7. The packet buffer device according to claim 1, further comprising:

an empty buffer pointer, for each buffer type, including an empty buffer leading pointer linking empty buffers in a chain, and an empty buffer count, wherein a buffer management unit, for each buffer, including a buffer type, and a next address of empty buffer linked in a chain, and wherein the packet buffer controller sequentially acquires buffers from the empty buffer indicated by the empty buffer leading pointer according to buffer type information from the buffer type determination unit, and controls packet assembly.

8. A packet buffer device to store ATM cells multiplexed and input via multiple logical channels, and to assemble ATM cells corresponding to each logical channel into packets in a buffer, comprising:

a discrete buffer controller to generate a discrete buffer from a common buffer;

a buffer type determination unit to determine a buffer type to store an ATM cell for each input ATM cell;

a packet buffer controller to assign the ATM cell to the common buffer or to the discrete buffer according to the buffer type; and a buffer management unit including a buffer type for each buffer, wherein the discrete buffer controller further comprises:

a discrete buffer total designation unit to designate a discrete buffer total for each buffer type;

a buffer counter to count discrete buffers;

a buffer construction indication unit to indicate buffer construction; and a management unit to rewrite the buffer type of the buffer within the buffer management unit to a discrete buffer type, during buffer release processing following ATM cell output, when the buffer is a common buffer and a buffer construction indication is present in the buffer construction indication unit, to increase the buffer counter, and to turn off the buffer construction indication when the buffer counter reaches the discrete buffer total.

9. The packet buffer device according to claim 8, wherein the discrete buffer controller further comprises a buffer release indication unit to indicate buffer release, and wherein the management unit rewrites the buffer type of the buffer within the buffer management unit to a common buffer type, during buffer release processing following ATM cell output, when the buffer is a discrete buffer and a buffer release indication is present in the buffer release indication unit, to decrease the buffer count, and to turn off the buffer release indication when the buffer counter reaches the discrete buffer total.

10. The packet buffer device according to claim 9, further comprising:

a discrete empty buffer pointer including an empty buffer leading pointer linking empty buffers in a chain, and an empty buffer count; and an empty buffer count minimum value storage unit to store a minimum value pertaining to the empty buffer count, and wherein the discrete buffer controller further comprises:

an adjustment interval timer to set a period for optimization processing of the number of discrete buffers;

and wherein the management unit reads the empty buffer count minimum value at a period set by the adjustment interval timer, subtracts the empty buffer count minimum value from a value read from the discrete buffer total designation unit, sets the subtracted value in the discrete buffer total designation unit, and turns on the buffer release indication.

11. The packet buffer device according to claim 9, further comprising:

a discrete empty buffer pointer to hold an empty buffer leading pointer linking empty buffers in a chain, and an empty buffer count; and an empty buffer count minimum value storage unit to store a minimum value pertaining to the empty buffer count, and wherein the discrete buffer controller further comprises:

an adjustment interval timer to set a period for optimization processing of the number of discrete buffers;

a threshold value setting unit to set a threshold value for the empty buffer count minimum value in order to determine whether or not to perform optimization processing of the number of discrete buffers; and a release count designation unit to set a number of buffers to release, and wherein the management unit reads the empty buffer count minimum value at a period set by the adjustment interval timer, subtracts the setting in the release count designation unit from the discrete buffer total when the empty buffer count minimum value read is larger than the threshold value, sets the subtracted value in the discrete buffer total designation unit, and turns on the buffer release indication.

* * * * *